(12) United States Patent
Hirai

(10) Patent No.: US 8,320,226 B2
(45) Date of Patent: Nov. 27, 2012

(54) OPTICAL ELEMENT HAVING THREE OR MORE SUB-WAVELENGTH CONVEXO-CONCAVE STRUCTURES

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/141,134

(22) PCT Filed: Nov. 26, 2009

(86) PCT No.: PCT/JP2009/070282
§ 371 (c)(1),
(2), (4) Date: Jun. 21, 2011

(87) PCT Pub. No.: WO2010/082408
PCT Pub. Date: Jul. 22, 2010

(65) Prior Publication Data
US 2011/0255390 A1   Oct. 20, 2011

(30) Foreign Application Priority Data
Jan. 15, 2009  (JP) ................. 2009-006527

(51) Int. Cl.
*G11B 7/00* (2006.01)
(52) U.S. Cl. ......... 369/112.03; 369/112.04; 369/112.16; 369/112.17
(58) Field of Classification Search .............. None
See application file for complete search history.

(56) References Cited

U.S. PATENT DOCUMENTS

| | | | | |
|---|---|---|---|---|
| 5,015,835 A * | 5/1991 | Ohuchida et al. | ........... | 250/201.5 |
| 5,956,302 A * | 9/1999 | Maeda et al. | ............... | 369/44.23 |
| 7,465,591 B2 * | 12/2008 | Borden et al. | ................... | 438/16 |
| 2002/0003661 A1 | 1/2002 | Nakai | | |
| 2004/0264859 A1* | 12/2004 | Nagashima | ..................... | 385/37 |
| 2005/0213212 A1 | 9/2005 | Ooi et al. | | |
| 2008/0008059 A1* | 1/2008 | Seo | ............. | 369/44.23 |
| 2008/0106789 A1* | 5/2008 | Hirai et al. | .................... | 359/495 |
| 2009/0231981 A1 | 9/2009 | Hirai | | |
| 2009/0231982 A1 | 9/2009 | Hirai | | |
| 2011/0002215 A1 | 1/2011 | Hirai | | |

FOREIGN PATENT DOCUMENTS

JP  2001-343512 A  12/2001
JP  2004-37480 A   2/2004

(Continued)

OTHER PUBLICATIONS

Machine translation of JP 2008-257771 (Oct. 23, 2008), on Jul. 9, 2012.*

(Continued)

*Primary Examiner* — Paul Huber
(74) *Attorney, Agent, or Firm* — Dickstein Shapiro LLP

(57) ABSTRACT

A disclosed optical element includes three or more sub-wavelength convexo-concave structures having pitches less than a wavelength of an incident light incident to the optical element and having groove depths equal to each other and a periodic structure having the three or more sub-wavelength convexo-concave structures, the pitch of the periodic structure greater than the wavelength of the incident light, in which a predetermined polarization direction of the incident light is diffracted mainly into a specific order.

11 Claims, 33 Drawing Sheets

FOREIGN PATENT DOCUMENTS

| | | |
|---|---|---|
| JP | 2004-78091 A | 3/2004 |
| JP | 2004-184505 A | 7/2004 |
| JP | 2004-354539 A | 12/2004 |
| JP | 2005-3758 A | 1/2005 |
| JP | 2008-241879 A | 10/2008 |
| JP | 2008-257771 A | 10/2008 |
| JP | 2008-262620 A | 10/2008 |
| JP | 2008-276823 A | 11/2008 |
| JP | 2009-223938 A | 10/2009 |

OTHER PUBLICATIONS

Kikuta, Hisao et al., "Formation of Wavefront and Polarization with Sub-Wavelength Gratings", Optics, 1998, vol. 27, No. 1, pp. 12-17 (with English translation).

Ono, Yuzo, "Polarizing Holographic Optical Element", O plus E, Mar. 1991, No. 136, pp. 86-90 (with English translation).

Sato, Takashi, "Forming Dielectric Photonic Crystals and Applied device", O plus E, Dec. 1999, vol. 21, No. 12, pp. 1554-1559 (with English translation).

* cited by examiner

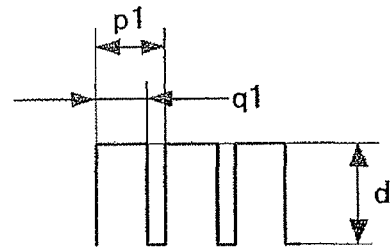
FIG.2B1
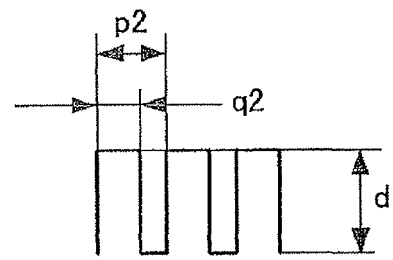
FIG.2B2
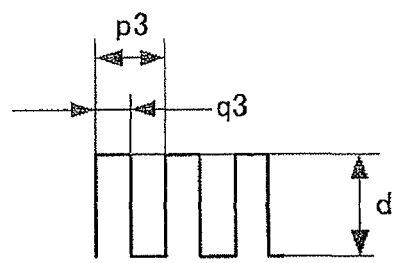
FIG.2B3
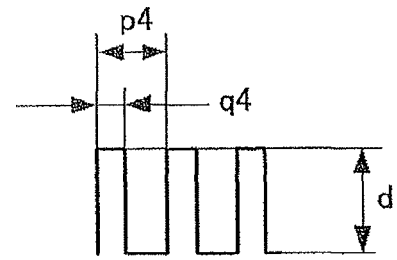
FIG.2B4
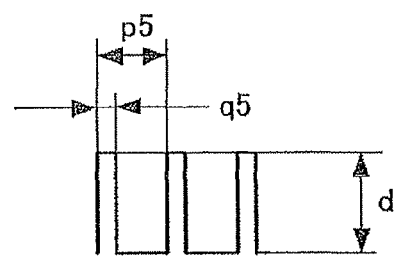
FIG.2B5

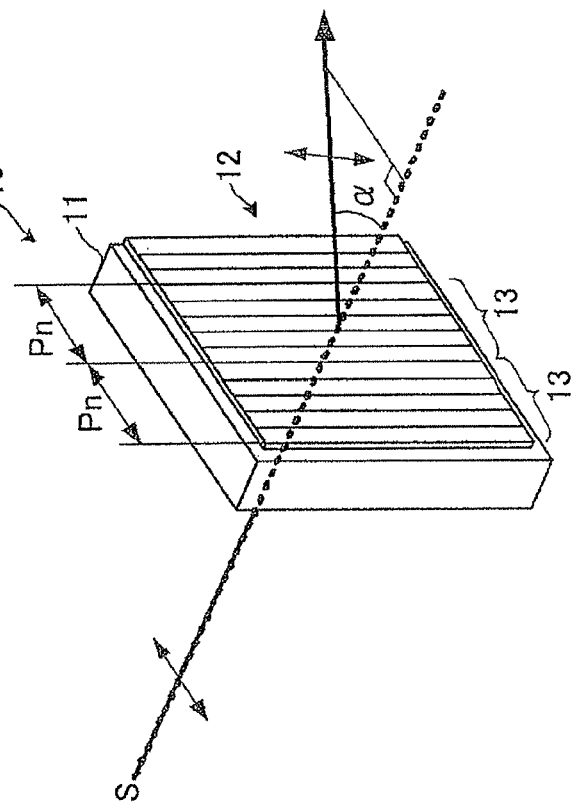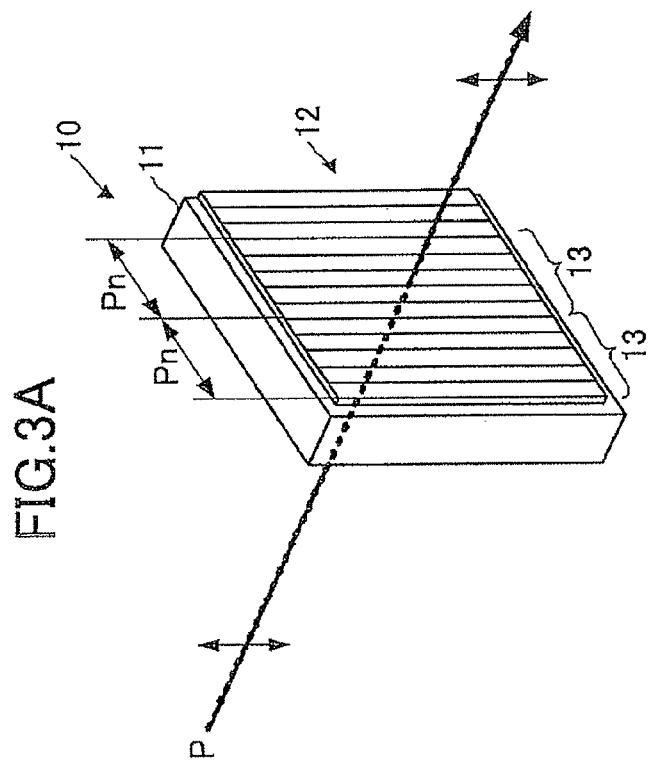

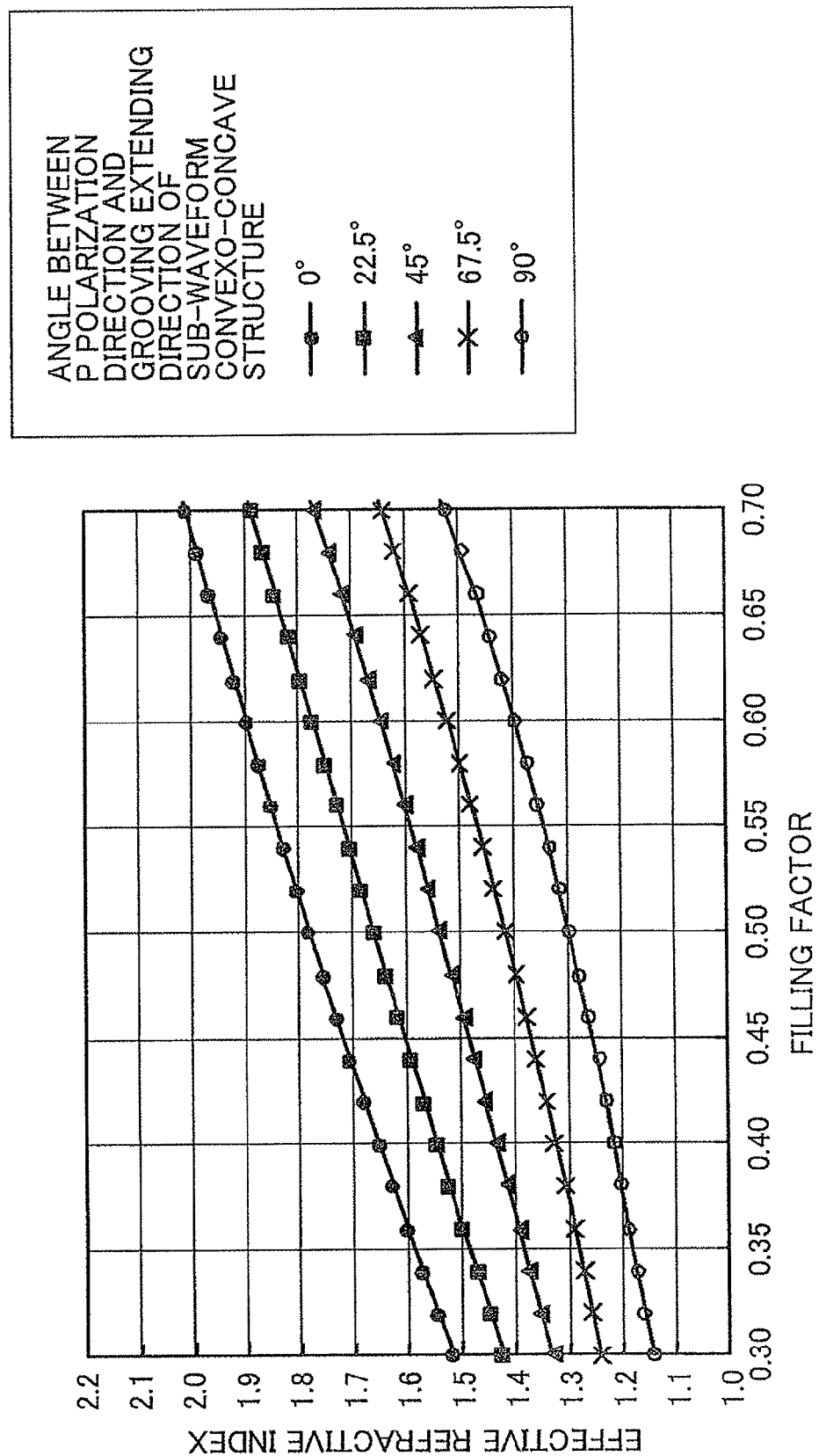

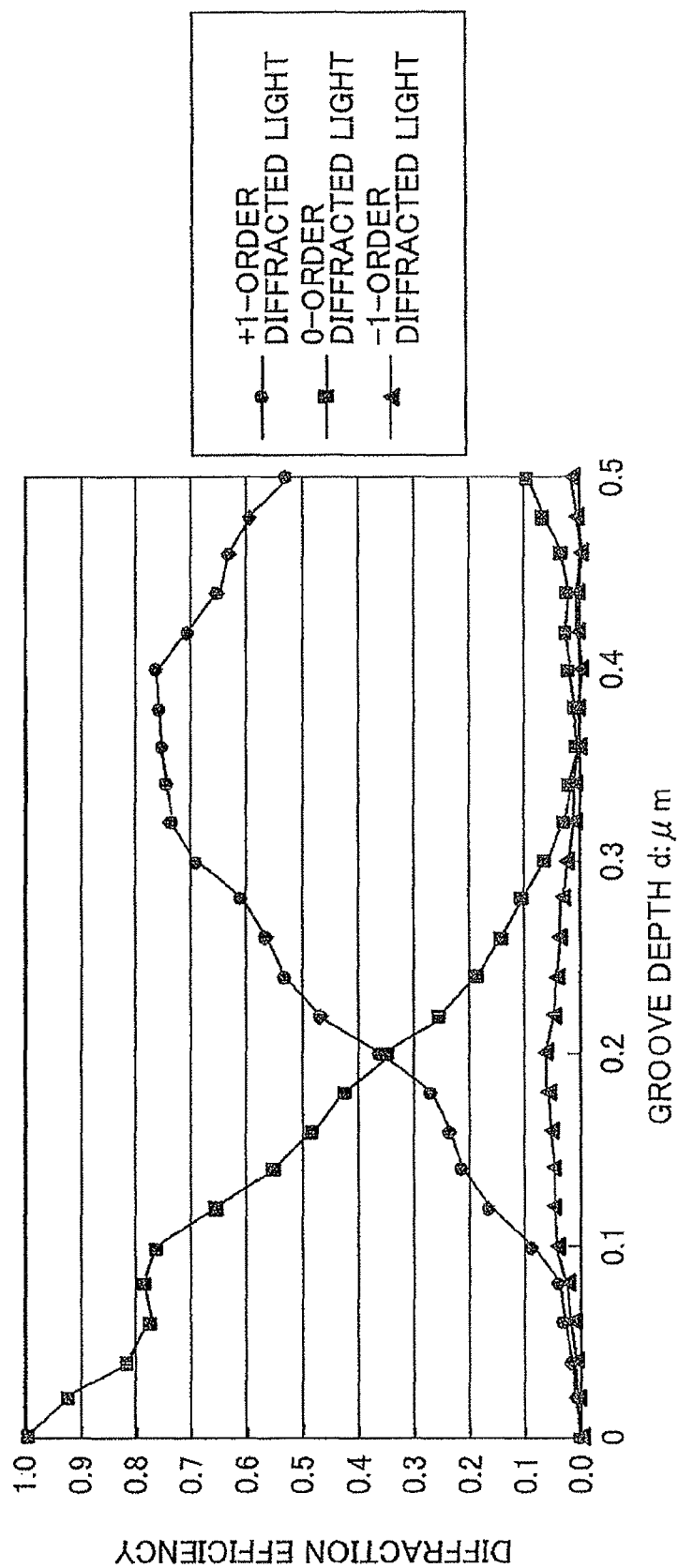

FIG.8C
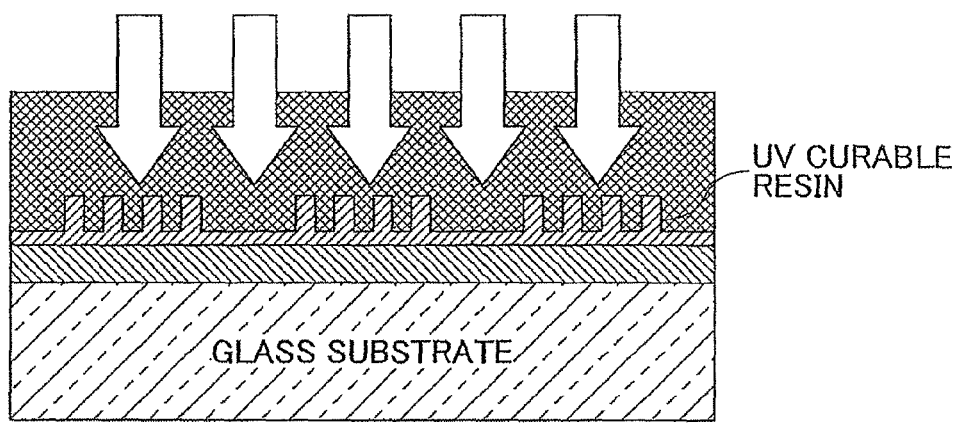
FIG.8D
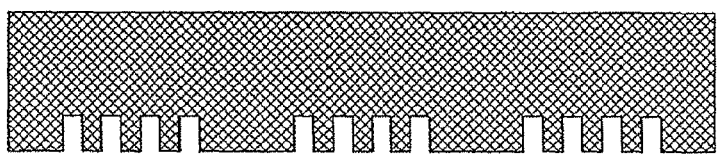
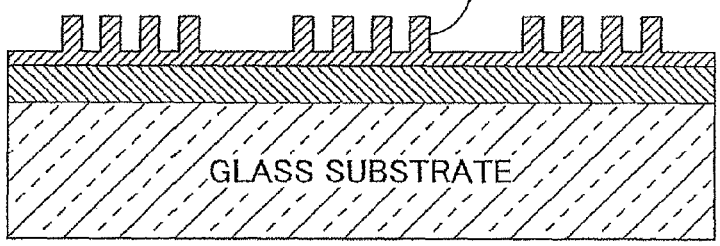

FIG.9C
UV IRRADIATION
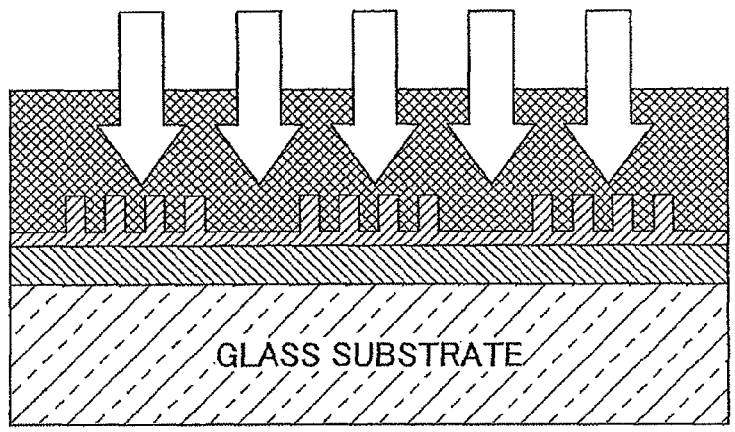
FIG.9D
REMOVE MOLD PATTERN
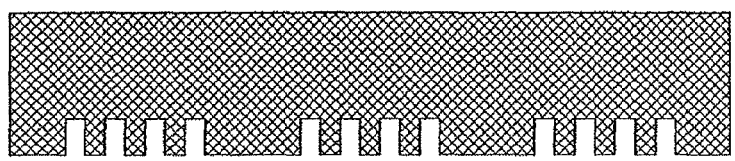
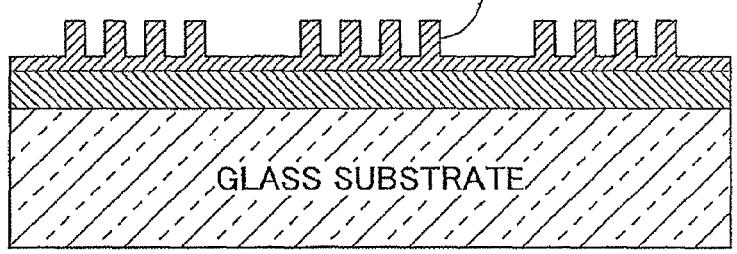
RESIN MASK PATTERN

US 8,320,226 B2

OPTICAL ELEMENT HAVING THREE OR MORE SUB-WAVELENGTH CONVEXO-CONCAVE STRUCTURES

This application is a 371 of PCT/JP2009/070282, filed Nov. 26, 2009.

TECHNICAL FIELD

The present invention relates to an optical element capable of diffracting light based on a polarization direction of the light, an optical apparatus having the optical element, an optical pickup having the optical element, an optical information processing apparatus having the optical element, an optical attenuator having the optical element, an polarization conversion element having the optical element, a projector optical system having the optical element, the optical attenuator, and the polarization conversion element, and an optical apparatus system including any of the above.

BACKGROUND ART

In an optical pickup, optical information processing apparatus, optical attenuator, polarization conversion element, optical apparatus, projector optical system, a projector having any of the above, and various optical apparatus systems having any of the above, an optical element is used such as a polarization separation element capable of separating an optical path of an incident light based on a polarization direction of the incident light (see, for example, Patent Documents 1 through 7 and Non-Patent Documents 1 through 3).

As a known example of the optical element, FIG. 17 shows the polarization separation element 100 using a thin film 102 (see, for example, Patent Document 1) for separating the optical path. As shown in FIG. 17, the polarization separation element 100 includes two triangular prisms 101 and a thin film 102 formed on a boundary surface bonded between the two triangular prisms 101. By having this structure, the polarization separation element 100 separates an incident light "A" including a P-polarization component and an S-polarization component by transmitting the P-polarization component (A1) and reflecting the S-polarization component (A2). However, when the polarization separation element 100 as shown in FIG. 17 including the structure having the two triangular prisms 101 stuck together is used, the size of the polarization separation element 100 is large and the transmittance of the incident light "A" may largely fluctuate depending on the incident angle of the incident light "A".

Polarization Separation Element Using Sub-Wavelength Convexo-Concave Structure (1)

On the other hand, as shown in FIGS. 18 and 19, there have been proposed optical elements 110 and 120, respectively, capable of serving as a double refraction wavelength plate, reflection prevention structure, polarization separation element and the like by having a sub-wavelength convexo-concave structure having a fine periodic structure having a pitch less than the wavelength of the incident light "A" (see, for example, Patent Document 1 and Non-Patent Documents 1 through 3). According to a report, the fluctuation of optical characteristics of the optical elements due to the change of the incident angle of the incident light is better-controlled, so that the optical characteristics of the optical elements are improved.

As shown in FIG. 18, the optical element 110 includes a material "nA" part and a material "nB" part, serving as a polarization separation element having the sub-wavelength convexo-concave structure "B" formed along a part of a grating period "Pt". In the sub-wavelength convexo-concave structure "B", an element boundary formed between the material "nA" part and the material "nB" part has a rectangular grating shape to form a fine periodic structure. The grating period of the fine periodic structure is defined as "pA" and a filling factor "fA" is defined as a ratio of the length of the material "nA" part to the grating period "pA". Further, thicknesses of the material "nA" part and the material "nB" part are given as "dA" and "dB", respectively.

On the other hand, as shown in FIG. 19, the optical element 120 includes a material "nA" part, a material "nB" part, and a material "nC" part, serving as a polarization separation element having the sub-wavelength convexo-concave structure "B" formed along a part of a grating period "Pt". In this sub-wavelength convexo-concave structure "B", there are triangular gratings formed as a part of a multilayer film including the material "nA" part and the material "nB" part. The material "nC" part is in contact with the multilayer film by an element boundary.

In the optical elements 110 and 120, the S-polarization component included in the incident light "A" travels in one direction as a zero-order diffracted light, and on the other hand, the P-polarization component included in the incident light "A" is separated into two directions as +/−1 diffracted lights. Namely, a light flux of a specific polarization direction (in this case, P-polarization component) is separated into two different directions. As a result, use efficiency of the light flux may be decreased.

Polarization Separation Element Using Sub-Wavelength Convexo-Concave Structure (2)

As an optical element capable of overcoming the problem, there has been proposed a polarization separation element 130 as shown in FIGS. 20A and 20B (see also, for example, Patent Document 1). FIG. 20A is a perspective view of the polarization separation element 130, and FIG. 20B is a cross-sectional view of the polarization separation element 130 cut along the line b-b in FIG. 20A.

As shown in FIG. 20A, in the polarization separation element 130, there is provided a diffraction grating "D" to perform diffraction separation. The diffraction grating "D", as shown in FIG. 20B, has a one-dimensional blazed grating shape having the grating period "Pt" along the direction of the line b-b in FIG. 20A. Further, as shown in FIG. 20B, the grating shape of the cross-section of the diffraction grating "D" includes a first diffraction grating part "E" formed on a substrate "C" and having a blazed shape and a second diffraction grating part "F" formed on the first diffraction grating part "E". Further, in the second diffraction grating part "F", a sub-wavelength convexo-concave structure "B" is superimposed having a fine periodic structure across the entire light incident surface, the fine periodic structure having a pitch less than the wavelength of the incident light.

By having this structure, the light flux incident to the diffraction grating "D" is diffracted in different directions based on the polarization directions of the light flux; and further, the diffraction direction with respect to each polarization direction is directed mainly to a direction of a specific order only, so that the polarization separation element 130 may be used similar to a polarization separation element having thin films.

Patent Document 1: Japanese Patent Application Publication No. 2001-343512
Patent Document 2: Japanese Patent Application Publication No. 2008-257771
Patent Document 3: Japanese Patent Application Publication No. 2008-262620
Patent Document 4: Japanese Patent Application Publication No. 2008-276823

Patent Document 5: Japanese Patent Application Publication No. 2005-3758

Patent Document 6: Japanese Patent Application Publication No. 2004-37480

Patent Document 7: Japanese Patent Application Publication No. 2004-184505

Non-Patent Document 1: Hisao KIKUTA, Koichi IWATA "Formation of Wavefront and Polarization with Sub-Wavelength Gratings", Optics, 1998, Vol. 27, No. 1, p. 12-17

Non-Patent Document 2: Yuzo ONO, "Polarizing Holographic Optical Element", O plus E, 1991 March, No. 136, p 86-90

Non-Patent Document 3: Nao SATO "Forming Dielectric Photonic Crystals and Applied device", O plus E, 1999 December, Vol. 21, No. 12, p 1554-1559

DISCLOSURE OF THE INVENTION

Problems to be Solved by the Invention

However, unfortunately, it may be difficult to form such a complicated blazed shape as shown in FIG. 20B. Typically, an etching method is used to form such a groove of the sub-wavelength convexo-concave structure but the etching method is adapted to form grooves having the same depth; therefore, there may arise a problem in forming such a blazed sub-wavelength convexo-concave structure having grooves with continuously-varying depths as shown in FIG. 20B when the etching method is used.

According to an embodiment of the present invention, there may be provided an optical element capable of diffracting a light mainly to a specific order based on a polarization direction of the light, an optical pickup having the optical element, an optical information processing apparatus having the optical element, an optical apparatus having the optical element, an optical attenuator having the optical element, a polarization conversion element having the optical element, a projector optical system having the optical element, the optical attenuator, and the polarization conversion element, and an optical apparatus system including any of the above.

Means for Solving the Problems

According to a first aspect of the present invention, there is provided an optical element including three or more sub-wavelength convexo-concave structures having pitches less than a wavelength of an incident light incident to the optical element and having groove depths equal to each other and a periodic structure having the three or more sub-wavelength convexo-concave structures, the pitch of the periodic structure greater than the wavelength of the incident light. In the optical element, a predetermined polarization direction (component) of the incident light is diffracted mainly to a specific order.

According to a second aspect of the present invention, there is provided the optical element according to the first aspect, in which groove extending directions of the three or more sub-wavelength convexo-concave structures are formed so as to be different from each other and filling factors of the three or more sub-wavelength convexo-concave structures are set so that refractive indexes of the three or more sub-wavelength convexo-concave structures with respect to a polarization direction (component) different from the predetermined polarization direction (component) are the same as each other.

According to a third aspect of the present invention, there is provided the optical element according to the first or the second aspect, in which the groove depths are set so that the predetermined polarization direction (component) of the incident light is diffracted mainly to the specific order.

According to a fourth aspect of the present invention, there is provided the optical element according to any one the first through the third aspects, in which the optical element includes two or more of the periodic structures and the pitches of the two or more periodic structures are different from each other so that the predetermined polarization direction (component) of the incident light is diffracted mainly to the specific order.

According to a fifth aspect of the present invention, there is provided the optical element according to any one the first through the fourth aspects, in which the optical element is either a transmissive element or a reflective element.

According to a sixth aspect of the present invention, there is provided an optical apparatus including two or more optical elements each according to any one of the first through fifth aspects, in which a light having been transmitted through one of the optical elements is incident to another optical element.

According to a seventh aspect of the present invention, there is provided an optical pickup including the optical element according to any one of the first through the sixth aspects, in which information is recorded in and/or read from a recording medium via the optical pickup.

According to an eighth aspect of the present invention, there is provided an optical information processing apparatus including the optical pickup according to the seventh aspect, in which, by using the optical pickup, the information of the recoding medium is processed.

According to a ninth aspect of the present invention, there is provided an optical attenuator including at least one of the optical element according to any one of the first through the fifth aspects and the optical apparatus according to the sixth aspect and attenuation means capable of attenuating a light transmitted through the optical element.

According to a tenth aspect of the present invention, there is provided a polarization conversion element including at least one of the optical element according to any one of the first through the fifth aspects and the optical apparatus according to the sixth aspect and a conversion element capable of converting a polarization direction of a light transmitted through the optical element.

According to an eleventh aspect of the present invention, there is provided a projector optical system including at least one of the optical element according to any one of the first through the fifth aspects, the optical apparatus according to the six aspect, the optical attenuator according to the ninth aspect, and the polarization conversion element according to the tenth aspect, so that a light transmitted through the optical element is projected.

According to a twelfth aspect of the present invention, there is provided an optical apparatus system including at least one of the optical element according to any one of the first through the fifth aspects, the optical apparatus according to the sixth aspect, the optical pickup according the seventh aspect, the optical information processing apparatus according the eighth aspect, the optical attenuator according the ninth aspect, the polarization conversion element according to the tenth aspect, and the projector optical system according eleventh aspect.

Effects of the Present Invention

According to an embodiment of the present invention, an optical element includes three or more sub-wavelength convexo-concave structures having pitches less than a wavelength of an incident light incident to the optical element and having groove depths equal to each other and a periodic structure having the three or more sub-wavelength convexo-concave structures, the pitch of the periodic structure greater than the wavelength of the incident light, so that a predetermined polarization direction (component) of the incident light is diffracted mainly to a specific order. Therefore, the light may be diffracted to a specific order depending on the polarization direction (component) of the incident light. By having these features, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced and the strength of the optical element may be enhanced compared with a blazed optical element.

According to an embodiment of the present invention, groove extending directions of the three or more sub-wavelength convexo-concave structures are formed so as to be different from each other and filling factors of the three or more sub-wavelength convexo-concave structures are set, so that refractive indexes of the three or more sub-wavelength convexo-concave structures with respect to a polarization direction different from the predetermined polarization direction are the same as each other. By having these features, by adequately setting the groove extending directions and the filling factors of the sub-wavelength convexo-concave structures, the polarization direction (component) different from the predetermined polarization direction (component) may not be diffracted and the predetermined polarization direction (component) may be diffracted. By having these features, therefore, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced and the strength of the optical element may be enhanced compared with a blazed optical element.

According to an embodiment of the present invention, the groove depths are set so that the predetermined polarization direction (component) of the incident light is diffracted mainly to a specific order. By having this feature, based on the setting of the groove depth, it may become possible to diffract the predetermined polarization direction (component) of the incident light mainly to a specific order. By having this feature, therefore, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced and the strength of the optical element may be enhanced compared with a blazed optical element.

According to an embodiment of the present invention, the optical element includes two or more periodic structures and the pitches of the two or more periodic structures are different from each other so that the predetermined polarization direction (component) of the incident light is diffracted mainly to a specific order. By having this feature, based on the polarization direction (component) of an incident light, it may become possible to diffract the polarization direction (component) of the incident light mainly to a specific order. By having this feature, therefore, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced and the strength of the optical element may be enhanced compared with a blazed optical element. Further, the optical element may have a lens function.

According to an embodiment of the present invention, the optical element is either a transmissive element or a reflective element. By having this feature, based on the polarization direction (component) of an incident light, it may become possible to diffract the polarization direction (component) of the incident light mainly to a specific order. By having this feature, therefore, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced and the strength of the optical element may be enhanced compared with a blazed optical element. Further, the optical element may be formed as the transmissive element or reflective element based on the purpose of use or the like.

According to an embodiment of the present invention, by having two or more optical elements described above, so that a light having been transmitted through one of the optical elements is incident to the other or another optical element, based on the polarization direction (component) of an incident light, it may become possible to diffract the polarization direction (component) of the incident light mainly to a specific order. By having this feature, therefore, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced. Further the strength of the optical element may be enhanced and the optical element having better optical characteristics may be provided compared with a blazed optical element.

According to an embodiment of the present invention, an optical pickup includes any one of the optical elements described above, so that information is recorded in and/or read from a recording medium. By having this feature, based on the polarization direction (component) of an incident light, it may become possible to diffract the polarization direction (component) of the incident light mainly to a specific order. By having this feature, therefore, a low-cost and size-reduced optical pick up may be provided using the optical element described above. Namely, the optical element may be manufactured easily using the photolithographic and the etching technologies and many optical elements may be manufactured at the same time. Further, the size and the weight of the optical element may be reduced and a degree of freedom of selecting a material of the optical element may be increased. Further, the assembly process and the cost of the optical element may also be reduced. Further, the strength of the optical element may be enhanced and the optical element having better optical characteristics may be provided compared with a blazed optical element.

According to an embodiment of the present invention, an optical information processing apparatus includes the optical pickup described above, so that, by using the optical pickup, the information of the recoding medium is processed. By having this feature, therefore, a low-cost and size-reduced optical information processing apparatus may be provided using the optical element described above. Namely, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced. Further the strength of the optical element may be enhanced and the optical element having better optical characteristics may be provided compared with a blazed optical element.

According to an embodiment of the present invention, an optical attenuator includes any one of the optical elements described above and an attenuation means capable of attenuating a light transmitted through the optical element. By having this feature, therefore, a low-cost and size-reduced optical attenuator may be provided using the optical element described above. Namely, the optical element may be manufactured easily using the photolithographic and the etching technologies and many optical elements may be manufactured at the same time. Further, the size and the weight of the optical element may be reduced and a degree of freedom of selecting a material of the optical element may be increased. Further, the assembly process and the cost of the optical element may also be reduced. Further, the strength of the optical element may be enhanced and the optical element having better optical characteristics may be provided compared with a blazed optical element.

According to an embodiment of the present invention, a polarization conversion element includes any one of the optical element described above and a conversion element capable of converting a polarization direction of a light transmitted through the optical element. By having this feature, therefore, a low-cost and size-reduced polarization conversion element may be provided using the optical element described above. Namely, the optical element may be manufactured easily using the photolithographic and the etching technologies and many optical elements may be manufactured at the same time. Further, the size and the weight of the optical element may be reduced and a degree of freedom of selecting a material of the optical element may be increased. Further, the assembly process and the cost of the optical element may also be reduced. Further, the strength of the optical element may be enhanced and the optical element having better optical characteristics may be provided compared with a blazed optical element.

According to an embodiment of the present invention, a projector optical system includes at least one of any one of the optical element described above, the optical attenuator described above, and the polarization conversion element described above, so that a light transmitted through the optical element is projected. By having this feature, therefore, a low-cost and size-reduced projector optical system may be provided using the optical element described above. Namely, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced. Further the strength of the optical element may be enhanced and the optical element having better optical characteristics may be provided compared with a blazed optical element.

According to an embodiment of the present invention, an optical apparatus includes at least one of any one of the optical element described above, the optical pickup described above, the optical information processing apparatus described above, the optical attenuator described above, the polarization conversion element described above, and the projector optical system described above. By having this feature, therefore, a low-cost and size-reduced optical apparatus may be provided using the optical element described above. Namely, the optical element may be manufactured easily using the photolithographic and the etching technologies and many optical elements may be manufactured at the same time. Further, the size and the weight of the optical element may be reduced and a degree of freedom of selecting a material of the optical element may be increased. Further the assembly process and the cost of the optical element may also be reduced. Further the strength of the optical element may be enhanced and the optical element having better optical characteristics may be provided compared with a blazed optical element.

BRIEF DESCRIPTION OF THE DRAWINGS

FIGS. 2A and 2B1 through 2B5 are schematic drawings showing a sub-wavelength convexo-concave structure formed in the optical element of FIG. 1;

FIGS. 3A and 3B are perspective views showing diffraction directions when an incident light travels (transmits) through the optical element of FIG. 1;

FIG. 4 is a graph showing relationships between a filling factor and an effective refractive index in the sub-wavelength convexo-concave structure in FIG. 2A;

FIG. 5 is a graph showing relationships between a depth of grooves and diffraction efficiency in the sub-wavelength convexo-concave structure in FIG. 2;

FIGS. 8A through 8I sequentially show a process of forming the optical element of FIG. 1;

FIGS. 9A through 9G sequentially show another process of forming the optical element of FIG. 1;

Figure 1:
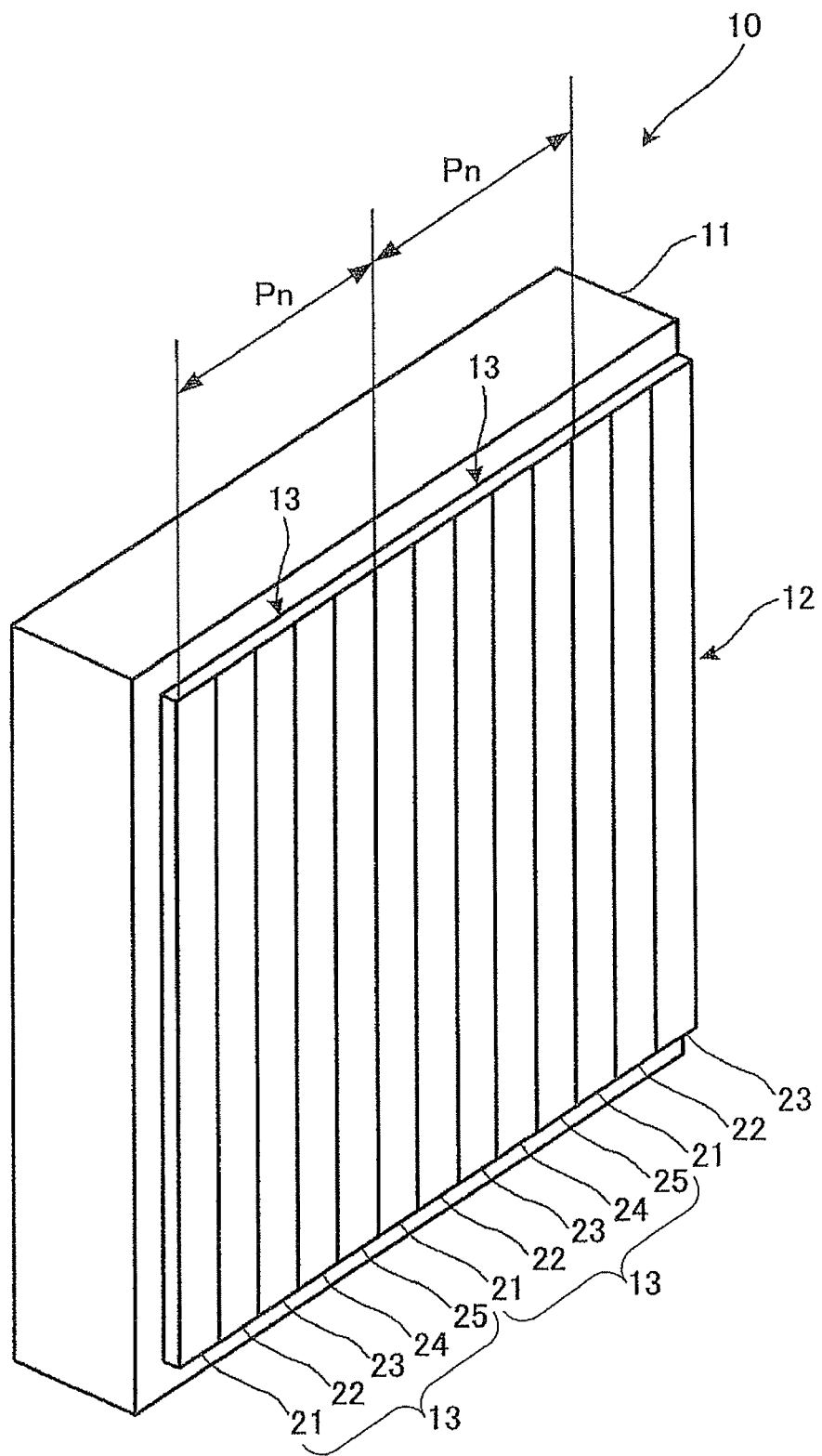
FIG. 1 is a schematic drawing showing an optical element according to an embodiment of the present invention.

DESCRIPTION OF THE REFERENCE NUMERALS 10, 20, 30: OPTICAL ELEMENT
10: TRANSMISSIVE OPTICAL ELEMENT
13: PERIODIC STRUCTURE
20: OPTICAL ELEMENT INCLUDING PLURAL OPTICAL ELEMENTS
21, 22, 23, 24, 25: SUB-WAVELENGTH CONVEXO-CONCAVE STRUCTURE
30: REFLECTIVE OPTICAL ELEMENT
40: OPTICAL PICKUP
41: RECORDING MEDIUM
50: OPTICAL INFORMATION PROCESSING APPARATUS
60: ATTENUATION MEANS
70: OPTICAL ATTENUATOR
80: POLARIZATION CONVERSION ELEMENT
83: CONVERSION ELEMENT
90: OPTICAL APPARATUS
d: DEPTH OF GROOVE
p1, p2, p3, p4, p5: PITCH OF SUB-WAVELENGTH CONVEXO-CONCAVE STRUCTURE
Pn: PITCH OF PERIODIC STRUCTURE

BEST MODE FOR CARRYING OUT THE INVENTION

FIG. 1 schematically shows an optical element 10 according to an embodiment of the present invention. As shown in FIG. 1, the optical element 10 includes a transparent substrate 11 and a diffraction structure 12 formed on the substrate 11, serving as a diffraction element. The diffraction structure 12 includes plural periodic structures 13. In FIG. 1, for simplification purposes, there are only two periodic structures 13. However, practically, there may be many more periodic structures 13 formed on the substrate 11. Herein, the periodic length (i.e., width) of the periodic structure 13 is defined as a pitch "Pn" and is equal to or greater than the wavelength of the incident light incident to the optical element 10.

Each periodic structures 13 includes sub-wavelength convexo-concave structures 21, 22, 23, 24, and 25. Therefore, in the diffraction structure 12, there is provided a diffraction grating period which is same as the pitch "Pn" of the periodic structures 13 each including the sub-wavelength convexo-concave structures 21, 22, 23, 24, and 25 as a group. According to this embodiment of the present invention, each periodic structure 13 includes five (5) sub-wavelength convexo-concave structures 21, 22, 23, 24, and 25.

Figure 2A:
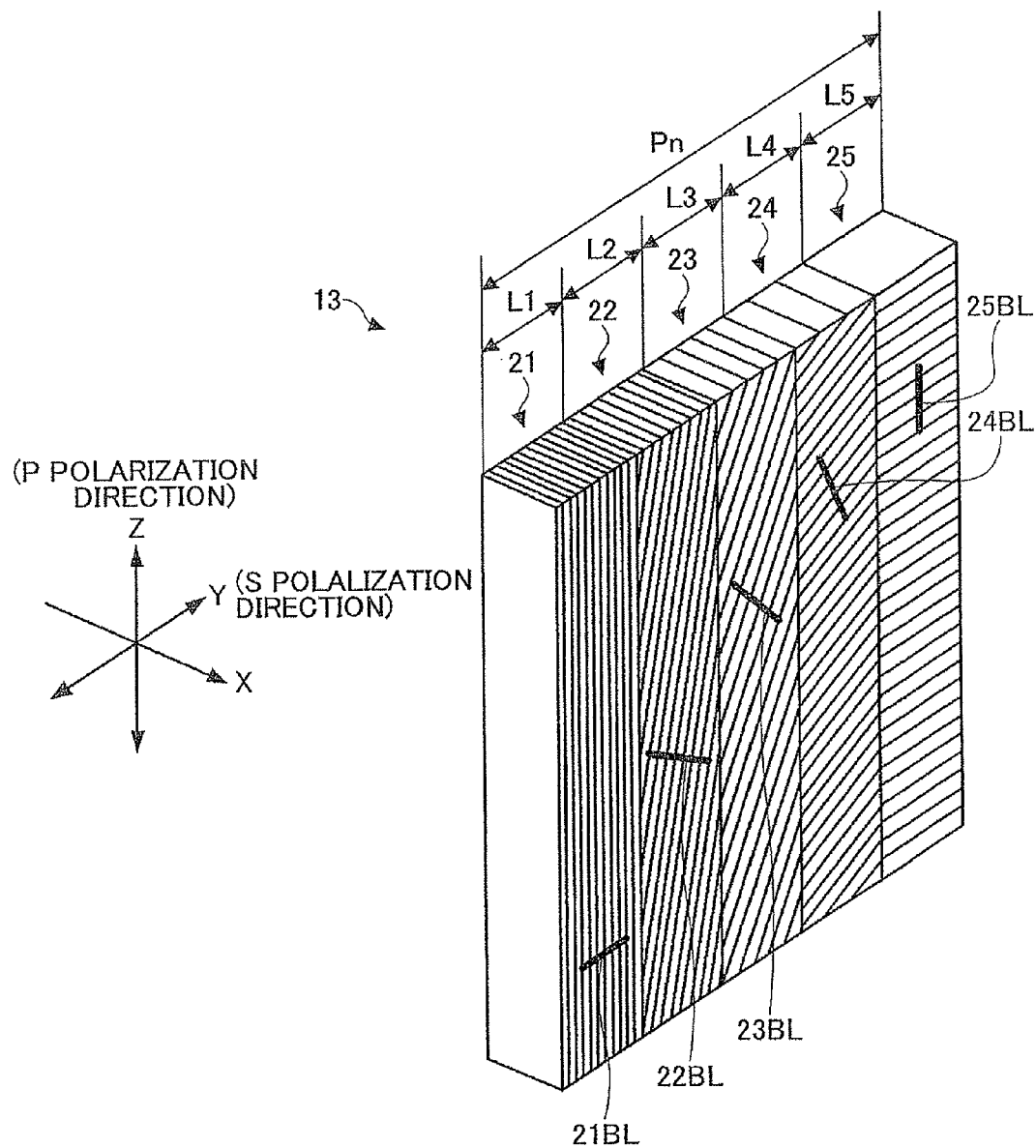

FIG. 2A is an enlarged view of the periodic structures 13 which is a cyclic part of the diffraction structure 12 formed on the substrate 11. As FIG. 2A shows, in the periodic structures 13, the widths (in the Y direction) of the sub-wavelength convexo-concave structures 21, 22, 23, 24, and 25 are denoted as L1, L2, L3, L4, and L5, respectively, and each of the widths is equal to or less than the wavelength of the incident light incident to the optical element 10. As a result, in the diffraction structure 12, the sub-wavelength convexo-concave structures 21, 22, 23, 24, and 25 having the width equal to or less than the wavelength of the incident light incident to the optical element 10 is superimposed on the periodic structures 13 having the pitch equal to or greater than the wavelength of the incident light incident to the optical element 10. The widths of L1, L2, L3, L4, and L5 are equal to each other in this embodiment of the present invention, however, the widths of L1, L2, L3, L4, and L5 may be different from each other.

In FIG. 2A, symbols X, Y, and Z denote the directions of three (3) axes orthogonal to each other. More specifically, the arrow in the X direction indicates the traveling direction of the incident light incident to the optical element 10; and the arrow in the Y direction indicates the width direction of the periodic structures 13, the sub-wavelength convexo-concave structures 21, 22, 23, 24, and 25, and the diffraction structure 12, namely the periodic direction of the periodic structures 13. Further, in this embodiment of the present invention, it is assumed that the arrow in the Y direction indicates the polarization direction of the S-polarization component included in the incident light incident to the optical element 10 and that the arrow in the Z direction indicates the polarization direction of the P-polarization component included in the incident light incident to the optical element 10.

FIGS. 2B1, 2B2, 2B3, 2B4, and 2B5 show enlarged cross-sections of the sub-wavelength convexo-concave structures 21, 22, 23, 24, and 25, respectively. As shown in the figures, the depth of the grooves formed in the sub-wavelength convexo-concave structures 21, 22, 23, 24, and 25 are the same with each other.

In the sub-wavelength convexo-concave structure 21, the grooves are formed extending in the Z direction; namely, the z direction is consistent with the groove extending direction of the sub-wavelength convexo-concave structure 21. The sub-wavelength convexo-concave structure 21 is formed in a manner so that all the cross-sections perpendicular to the groove extending direction (i.e., all the cross-sections of all the X-Y planes including the X-Y plane including the bold line 21BL parallel to the Y direction in FIG. 2A) have the same shape as shown in FIG. 2B1.

In the sub-wavelength convexo-concave structure 25, the grooves are formed extending in the Y direction; namely, the Y direction is consistent with the groove extending direction of the sub-wavelength convexo-concave structure 25. The sub-wavelength convexo-concave structure 25 is formed in a manner so that all the cross-sections perpendicular to the groove extending direction (i.e., all the cross-sections of all the Z-X planes including the Z-X plane including the bold line 25BL parallel to the Z direction in FIG. 2A) have the same shape as shown in FIG. 2B5.

In the sub-wavelength convexo-concave structure 23, the grooves are formed extending in the direction at 45 degrees with respect to the groove extending direction in the sub-wavelength convexo-concave structure 21 as well as the groove extending direction in the sub-wavelength convexo-concave structure 25; more specifically, the grooves are formed extending in the direction at 45 degrees with respect to the Z direction and the Y direction (i.e., the polarization direction of the P-polarization component and the polarization direction of the P-polarization component included in the incident light incident to the optical element 10). Therefore, the direction at 45 degrees with respect to the groove extending direction in the sub-wavelength convexo-concave structure 21 as well as the groove extending direction in the sub-wavelength convexo-concave structure 25 is consistent with the groove extending direction of the sub-wavelength convexo-concave structure 23. The sub-wavelength convexo-concave structure 23 is formed in a manner so that all the cross-sections perpendicular to the groove extending direction have the same shape as shown in FIG. 2B3. The extending direction of the bold line 23BL shown in the area of the sub-wavelength convexo-concave structure 23 in FIG. 2A is perpendicular to the groove extending direction of the sub-wavelength convexo-concave structure 23.

In the sub-wavelength convexo-concave structure 22, the grooves are formed extending in the direction so that the angle between the groove extending direction of the sub-wavelength convexo-concave structure 22 and the groove extending direction of the sub-wavelength convexo-concave structure 21 is the same as the angle between the groove extending direction of the sub-wavelength convexo-concave structure 22 and the groove extending direction of the sub-wavelength convexo-concave structure 23. More specifically, the groove extending direction of the sub-wavelength convexo-concave structure 22 is inclined at an angle of 22.5 degrees with respect to the polarization direction of the P-polarization component and at an angle of 67.5 degrees with respect to the polarization direction of the S-polarization component. The sub-wavelength convexo-concave structure 22 is formed in a manner so that all the cross-sections perpendicular to the groove extending direction of the sub-wavelength convexo-concave structure 22 have the same shape as shown in FIG. 2B2. The extending direction of the bold line 22BL shown in the area of the sub-wavelength convexo-concave structure 22 in FIG. 2A is perpendicular to the groove extending direction of the sub-wavelength convexo-concave structure 22.

In the sub-wavelength convexo-concave structure 24, the grooves are formed extending in the direction so that the angle between the groove extending direction of the sub-wavelength convexo-concave structure 24 and the groove extending direction of the sub-wavelength convexo-concave structure 23 is the same as the angle between the groove extending direction of the sub-wavelength convexo-concave structure 24 and the groove extending direction of the sub-wavelength convexo-concave structure 25. More specifically, the groove extending direction of the sub-wavelength convexo-concave structure 24 is inclined at an angle of 67.5 degrees with respect to the polarization direction of the P-polarization component and at an angle of 22.5 degrees with respect to the polarization direction of the S-polarization component. The sub-wavelength convexo-concave structure 24 is formed in a manner so that all the cross-sections perpendicular to the groove extending direction of the sub-wavelength convexo-concave structure 24 have the same shape as shown in FIG. 2B4. The extending direction of the bold line 24BL shown in the area of the sub-wavelength convexo-concave structure 24 in FIG. 2A is perpendicular to the groove extending direction of the sub-wavelength convexo-concave structure 24.

As shown in FIGS. 2B1, 2B2, 2B3, 2B4, and 2B5, each of the periodic lengths corresponding to the sub-wavelength convexo-concave structures 21, 22, 23, 24, and 25 (i.e., each of the pitches $p1, p2, p3, p4$, and $p5$) is equal to or less than the wavelength of the incident light incident to the optical element 10. Especially in this embodiment of the present invention, each of the periodic lengths ((i.e., each of the pitches $p1, p2, p3, p4$, and $p5$) is equal to or less than the half (½) of the wavelength of the incident light incident to the optical element 10.

Further, as shown in FIGS. 2B1 2B2, 2B3, 2B4, and 2B5, symbols $q1, q2, q3, q4$, and $q5$ denote the widths of the convex parts (land parts) of the sub-wavelength convexo-concave structures 21, 22, 23, 24, and 25, respectively. Therefore, filling factors $f1, f2, f3, f4,$ and $f5$ of the sub-wavelength convexo-concave structures 21, 22, 23, 24, and 25, are defined as $q1/p1, q2/p2, q3/p3, q4/p4,$ and $q5/p5$, respectively. The filling factors $f1, f2, f3, f4,$ and $f5$ are used to calculate an effective refractive index described below.

Further, when each of the pitches $p1, p2, p3, p4$, and $p5$ is equal to or less than the wavelength of the incident light incident to the optical element 10, a diffraction effect described below may be obtained. However, even in this case, if each of the pitches $p1, p2, p3, p4$, and $p5$ is almost equal to the wavelength of the incident light to the optical element 10, an unstable phenomenon called a resonance phenomenon may occur in which the diffraction effect and a so-called sub-wavelength effect are mixed. To reduce the influence of the sub-wavelength effect, as described above, it is preferable that each of the pitches $p1, p2, p3, p4$, and $p5$ is equal to or less than the half (½) of the wavelength of the incident light incident to the optical element 10. This is because in this embodiment of the present invention, each of the pitches $p1, p2, p3, p4$, and $p5$ is equal to or less than the half (½) of the wavelength of the incident light incident to the optical element 10.

From a technical point of view, an incident light diffracts in the optical element in accordance with the periodic structure having the period length (i.e., pitch) equal to or greater than the wavelength of the incident light; and a polarization selectivity selecting which of the P-polarization component and the S-polarization component is to be diffracted in accordance with the periodic structure having the period length (i.e., pitch) equal to or less than the wavelength of the incident light. In this embodiment of the present invention, due to the sub-wavelength convexo-concave structures 21, 22, 23, 24, and 25, the polarization selectivity is presented (provided) so that the S-polarization component of the incident light is to be diffracted. As a result, the light of the P-polarization component included in the incident light is transmitted in a deadband manner (i.e., travels in one direction as a zero-order diffracted light) as shown in FIG. 3A and on the other hand, the light of the S-polarization component included in the incident light is diffracted as shown in FIG. 3B.

Due to the sub-wavelength convexo-concave structures 21, 22, 23, 24, and 25, a generally-known "form birefringence" occurs (is present).

The form birefringence refers to a phenomenon in which, when two types of media having different refractive indexes from each other and having the pitches less than the wavelength of the incident light disposed in a stripe shape like the sub-wavelength convexo-concave structures 21, 22, 23, 24, and 25, the refractive index of the polarization component parallel to the direction of the stripe shape (TE-wave) becomes different from the refractive index of the polarization component perpendicular to the direction of the stripe shape (TM-wave), so that a birefringence effect occurs.

Herein, it is assumed that, as the two types of media having different refractive indexes from each other, air and a medium having a refractive index of n are provided and that a light having the wavelength equal to or greater than two times the pitch of the sub-wavelength convexo-concave structures is vertically incident. In this case, the effective refractive index of the sub-wavelength convexo-concave structure is given as in the following formulas depending on whether the polarization direction of the incident light is parallel (TE-direction) or perpendicular (TM-direction) to the groove extending direction of the sub-wavelength convexo-concave structure. In the formulas, symbols n(TE) and n(TM) denote the effective refractive indexes when the polarization direction of the incident light is parallel and perpendicular, respectively, to the groove extending direction of the sub-wavelength convexo-concave structure, and the symbol "f" denotes the filling factor $$\begin{cases} n(TE) = \sqrt{f \cdot n^2 + (1-f)} \\ n(TM) = \sqrt{f/n^2 + (1-f)} \end{cases} \quad \text{formula 1}$$

Therefore, from among the sub-wavelength convexo-concave structures 21, 22, 23, 24, and 25, herein, the effective refractive indexes when the polarization direction of the incident light is parallel (TE-direction) to the groove extending direction of the sub-wavelength convexo-concave structures 21 and 25 are given as n1(TE) and n5(TE) and the effective refractive indexes when the polarization direction of the incident light is perpendicular (TM-direction) to the groove extending direction of the sub-wavelength convexo-concave structures 21 and 25 are given as n1(TM) and n5(TM), respectively. Next, n1(TE), n1(TM), n5(TE), and n5(TM) are described in the following formula:

$$\begin{cases} n1(TE) = \sqrt{f1 \cdot n^2 + (1-f1)} \\ n1(TM) = \sqrt{f1/n^2 + (1-f1)} \\ n5(TE) = \sqrt{f5 \cdot n^2 + (1-f5)} \\ n5(TM) = \sqrt{f5/n^2 + (1-f5)} \end{cases} \quad \text{formula 2}$$

From among the sub-wavelength convexo-concave structures 21, 22, 23, 24, and 25, the effective refractive indexes of the sub-wavelength convexo-concave structures 22, 23, and 24 having the groove extending direction neither parallel nor perpendicular to any of the polarization directions of the incident light are determined based on the descriptions below:

In the sub-wavelength convexo-concave structure 23, the groove extending direction of the sub-wavelength convexo-concave structure 23 is directed midway between the groove extending direction of the sub-wavelength convexo-concave structure 21 and the groove extending direction of the sub-wavelength convexo-concave structure 25. Therefore, when assuming that the filling factor f3 is equal to f1 and f5 (i.e., f1=f5=f3), the effective refractive index of the sub-wavelength convexo-concave structure 23 is an intermediate value between the effective refractive indexes of the sub-wavelength convexo-concave structures 21 and 25.

In the same manner, in the sub-wavelength convexo-concave structure 22, the groove extending direction of the sub-wavelength convexo-concave structure 22 is directed midway between the groove extending direction of the sub-wavelength convexo-concave structure 21 and the groove extending direction of the sub-wavelength convexo-concave structure 23. Therefore, when assuming that the filling factor f2 is equal to f1 and f3 (i.e., f1=f3=f2), the effective refractive index of the sub-wavelength convexo-concave structure 22 is an intermediate value between the effective refractive indexes of the sub-wavelength convexo-concave structures 21 and 23. Further, in the sub-wavelength convexo-concave structure 24, the groove extending direction of the sub-wavelength convexo-concave structure 24 is directed midway between the groove extending direction of the sub-wavelength convexo-concave structure 23 and the groove extending direction of the sub-wavelength convexo-concave structure 25. Therefore, when assuming that the filling factor f4 is equal to f3 and f5 (i.e., f3=f5=f4), the effective refractive index of the sub-wavelength convexo-concave structure 24 is an intermediate value between the effective refractive indexes of the sub-wavelength convexo-concave structures 23 and 25.

Next, the form birefringence is described in more detail. When an incident light having the wavelength equal to or greater than two times the pitches p1, p2, p3, p4, and p5 of the sub-wavelength convexo-concave structures 21, 22, 23, 24, and 25, respectively, is vertically incident to the sub-wavelength convexo-concave structures 21, 22, 23, 24, and 25, the sub-wavelength convexo-concave structures 21, 22, 23, 24, and 25 transmit the incident light without diffracting the incident light and shows the birefringence effect so as to have different refractive indexes depending on the polarization directions of the incident light.

FIG. 4 shows exemplary relationships between the effective refractive index and the filling factor based on calculation results. In the calculations, it is assumed that the refractive index "n" of the sub-wavelength convexo-concave structures is 2.313 (i.e., n=2.313) and the wavelength of the incident light is 405 nm. As shown in FIG. 4, the effective refractive indexes of the sub-wavelength convexo-concave structures 21, 22, 23, 24, and 25 having the groove extending directions directed as described above vary depending on the values of the filling factor.

In the relationships of FIG. 4, when assuming that f1=0.30, f2=0.40, f3=0.50, f4=0.60, and f5=0.70, the following results are obtained.

Effective refractive indexes of sub-wavelength convexo-concave structure 21 in TE-direction: n1(P-polarization)=1.52

Effective refractive indexes of sub-wavelength convexo-concave structure 21 in TM-direction: n1(S-polarization)=1.15

Effective refractive indexes of sub-wavelength convexo-concave structure 22 in TE-direction: n2(P-polarization)=1.52

Effective refractive indexes of sub-wavelength convexo-concave structure 22 in TM-direction: n2(S-polarization)=1.31

Effective refractive indexes of sub-wavelength convexo-concave structure 23 in TE-direction: n3(P-polarization)=1.52

Effective refractive indexes of sub-wavelength convexo-concave structure 23 in TM-direction: n3(S-polarization)=1.52

Effective refractive indexes of sub-wavelength convexo-concave structure 24 in TE-direction: n4(P-polarization)=1.52

Effective refractive indexes of sub-wavelength convexo-concave structure 24 in TM-direction: n4(S-polarization)=1.77

Effective refractive indexes of sub-wavelength convexo-concave structure 25 in TE-direction: n5(P-polarization)=1.52

Effective refractive indexes of sub-wavelength convexo-concave structure 25 in TM-direction: n5(S-polarization)=2.01

Therefore, n1(P-polarization), n2(P-polarization), n3(P-polarization), n4(P-polarization), and n5(P-polarization) have the same value of 1.52 (i.e., n1(P-polarization)=n2(P-polarization)=n3(P-polarization)=n4(P-polarization)=n5(P-polarization)=1.52)

Therefore, according to this embodiment of the present invention, it may become possible to provide the sub-wavelength convexo-concave structures 21, 22, 23, 24, and 25 having different groove extending directions from each other and having adequate filling factors f1, f2, f3, f4, and f5 so that the effective refractive indexes of the sub-wavelength convexo-concave structures 21, 22, 23, 24, and 25 with respect to the P-polarization component have substantially the same value, the P-polarization component being different from the S-polarization component which is to be diffracted by the sub-wavelength convexo-concave structures 21, 22, 23, 24, and 25.

On the other hand, as shown in FIG. 4, the values of n1(S-polarization), n2(S-polarization), n3(S-polarization), n4(S-polarization), and n5(S-polarization) linearly change with the corresponding filling factors.

Therefore, by having such configuration described above with reference to FIG. 3A, the optical element 10 may become a plate-like body having substantially the same effective refractive index with respect to the P-polarization component of the incident light, the polarization direction of the P-polarization component of the incident light being in the direction parallel to the periodic direction of the diffraction structure in the optical element 10, so that the incident light travels through the optical element 10 without being diffracted by the optical element 10. Further, in this case, as shown in FIG. 3B, the plate-like body (i.e., optical element 10) may serve as a diffraction element in which the effective refractive index varies within the diffraction grating period with respect to the S-polarization component of the incident light, the polarization direction of the S-polarization component of the incident light being in the direction perpendicular to the periodic direction of the diffraction structure in the optical element 10, so that the incident light is diffracted.

As described above, the optical element 10 capable of serving as the diffraction element may serve as a polarization separation element capable of performing polarization-selective optical path branching.

Next, another characteristic of the diffraction efficiency of the optical element 10 is described with reference to FIG. 5. As shown in FIG. 5, the diffraction efficiency of the optical element 10 varies depending on the depth "d" of the grooves (hereinafter may be referred to as "groove depth") of the sub-wavelength convexo-concave structures 21, 22, 23, 24, and 25 (i.e., the depth of the grooves of the diffraction structure 12). FIG. 5 shows the relationships between the groove depth "d" and the diffraction efficiency assuming that the pitch Pn is 5 µm and each of the widths L1, L2, L3, L4, and L5 is 1 µm in addition to the above-mentioned conditions.

As apparent from FIG. 5, in the optical element 10, a value of the diffraction efficiency of +1-order diffracted light is different from that of −1-order diffracted light. For example, when the groove depth "d" is in a range of 0.3<d≦0.4, the diffraction efficiency of +1-order diffracted light is much greater than that of −1-order diffracted light. This may explain that, when groove depth "d" of the diffraction structure 12 including plural divided sub-wavelength convexo-concave structures is adequately determined (adjusted), the incident light may be diffracted mainly to a specific order (e.g. mainly to +1-order diffracted light as shown in FIG. 5). This may also apply to any other order diffracted light. Namely, the incident light may be diffracted mainly to a specific order diffracted light with respect to a predetermined polarization component in the incident light by determining (adjusting) the groove depth "d".

As described above, the optical element 10 according to the embodiment of the present invention may be provided in a manner so that the diffraction direction of a light flux incident to the optical element 10 differs depending on the polarization directions of the light flux and that the light flux with respect to each polarization direction may be diffracted mainly to a specific order.

Further, a symbol "α" in FIG. 3B denotes a diffraction angle with respect to the S-polarization component of the incident light diffracted due to the diffraction grating surface (i.e., diffraction structure 12) of the optical element 10. The diffraction angle "α" is expressed by the following formula:

$$\sin(\alpha) = \lambda 1 / Pn \qquad \text{formula 3}$$

Where symbols "λ1" and "Pn" denote the wavelength of the incident light and pitch, respectively.

Therefore, the pitch "Pn" may be selectable depending on a purpose of using the optical element 10.

Manufacturing Method of the Optical Element 10

Before describing the manufacturing method of the optical element 10, a forming method of a mold pattern (hereinafter may be simplified as pattern) to be used for manufacturing the optical element 10 is described.

Pattern Using Quartz as Substrate

FIGS. 6A through 6D schematically and sequentially show a process of forming a quartz pattern to be used for manufacturing the optical element 10.

Figure 6A:
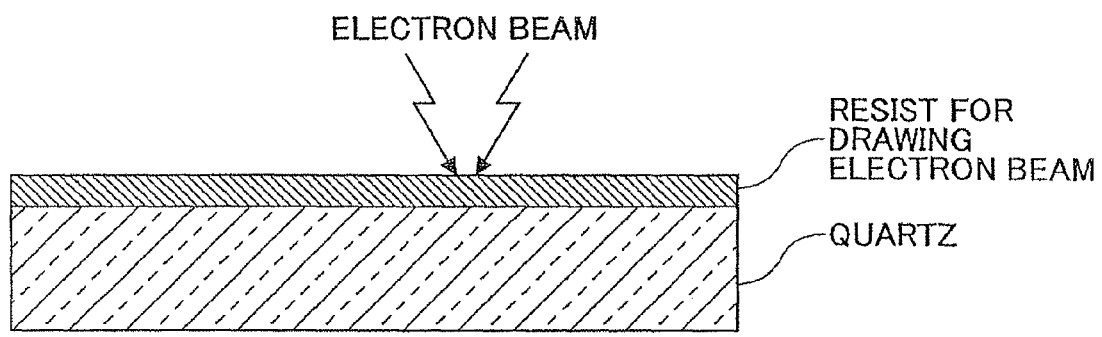
FIGS. 6A through 6D sequentially show a process of forming a pattern to be used for forming the optical element of FIG. 1.
Figure 6B:
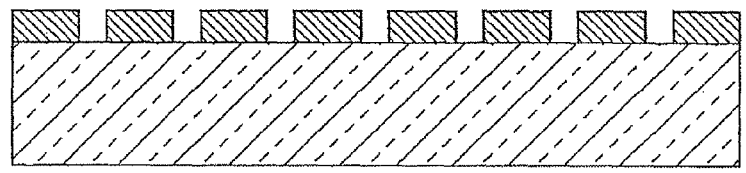

First, as shown in FIG. 6A, a quartz substrate is formed and a resist for drawing an electron beam is applied with a predetermined thickness to the surface of the quartz substrate, followed by pre-baking. Based on a program specifically designed, pitches and line widths corresponding to the specification of the diffraction grating to be formed on the quartz substrate are formed. As shown in FIG. 6B, after the resist is developed and rinsed, a structure corresponding to the sub-wavelength convexo-concave structures is formed on the resist. In this structure, the quartz substrate is exposed in the bottom of the grooves of the structure.

Figure 6C:
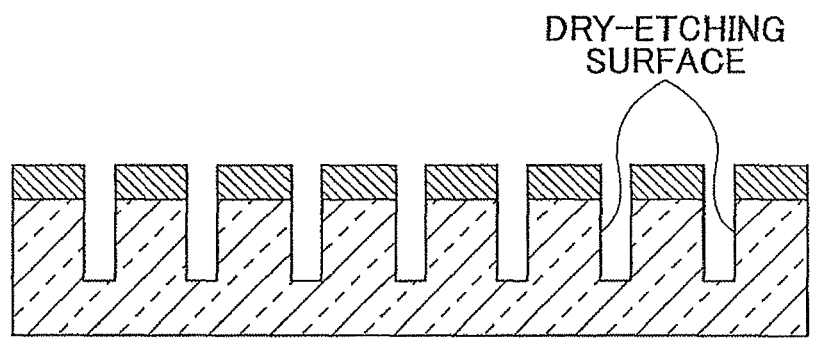

Next, as shown in FIG. 6C, dry etching of the quartz is performed using the resist pattern structure corresponding to the sub-wavelength convexo-concave structures as a mask. In this etching process, $CF_4$ or $CF_3$ gas is used in a dry-etching apparatus such as RIENLD, TCP or the like. Further, by applying a bias voltage to the quartz substrate, the etching vertical to the surface of the quartz substrate is performed.

Figure 6D:
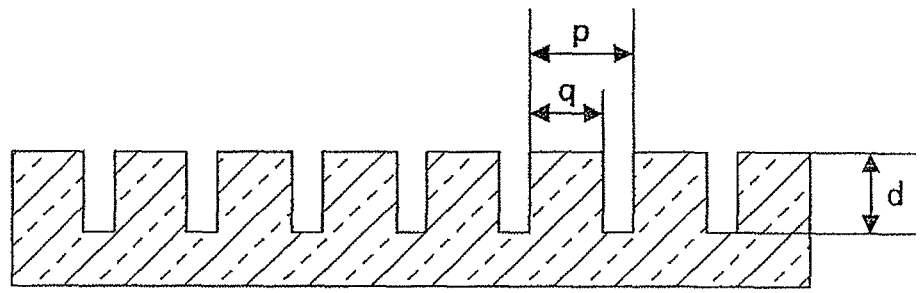

Next, as shown in FIG. 6D, the resist is peeled. The resist is peeled by a method in which oxygen gas is introduced and the resist is removed in oxygen gas plasma in the dry-etching apparatus or a method in which the substrate is taken out from the apparatus and the resist is removed by CAROS cleaning. The formed pattern is used as the quartz pattern.

Pattern Using Silicon as Substrate

FIGS. 7A through 7D schematically and sequentially show a process of forming a silicon pattern to be used for manufacturing the optical element 10.

Figure 7A:
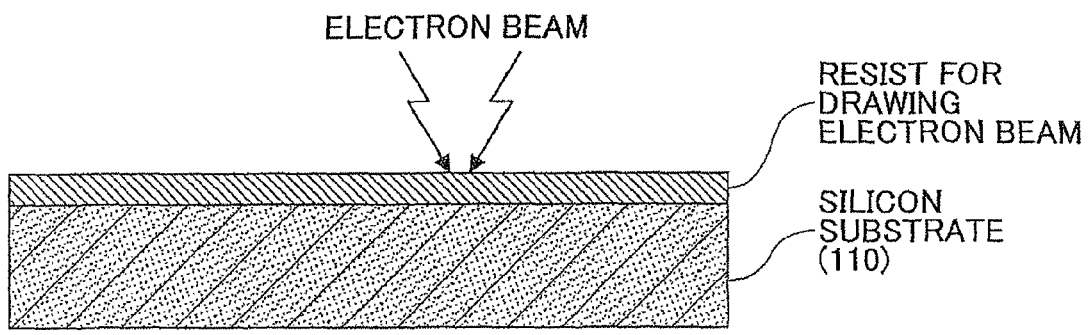
FIGS. 7A through 7D sequentially show a process of forming another pattern to be used for forming the optical element of FIG. 1.
Figure 7B:
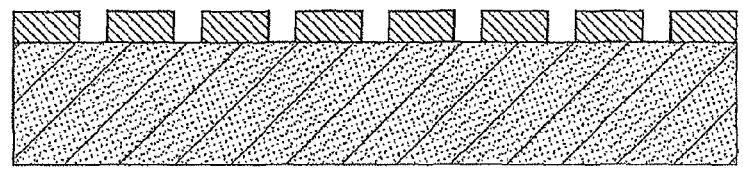

First, as shown in FIG. 7A, a silicon substrate (110) is formed and a resist for drawing an electron beam is applied with a predetermined thickness to the surface of the silicon substrate, followed by pre-baking. Based on a program specifically designed, pitches and line widths corresponding to the specification of the diffraction grating to be formed on the silicon substrate are formed. As shown in FIG. 7B, after the resist is developed and rinsed, a structure corresponding to the sub-wavelength convexo-concave structures is formed on the resist. In this structure, the silicon substrate is exposed in the bottom of the grooves of the structure.

Figure 7C:
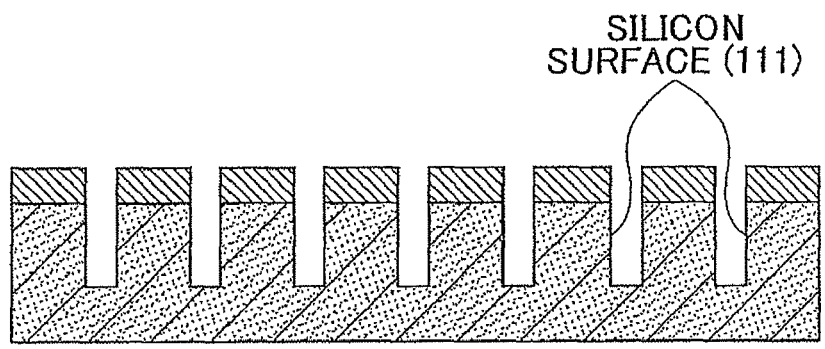

Next, as shown in FIG. 7C, alkali wet etching (using KOH solution) of the silicon is performed using the resist pattern structure corresponding to the sub-wavelength convexo-concave structures as a mask. In this case, the silicon substrate is etched in the depth direction while maintaining the pitch constant using (111) surface as a wall. Further, dry-etching using Bosch process may be used to form a similar structure.

Figure 7D:
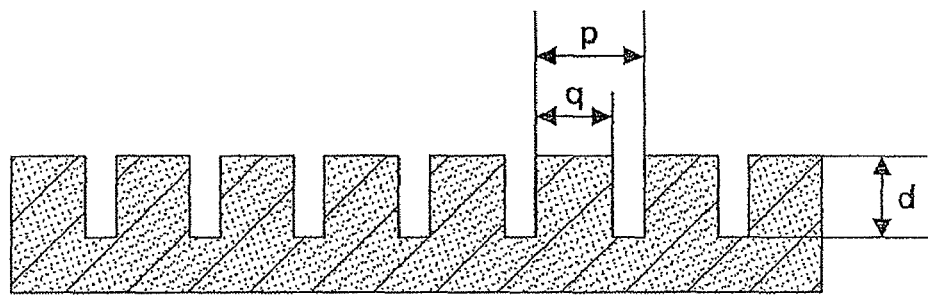

Next, as shown in FIG. 7D, the resist is peeled. The formed pattern is used as the silicon pattern.

The quartz pattern or the silicon pattern formed as described above may be called a mold pattern.

Manufacturing Diffraction Grating Using Mold Pattern

Next, methods of manufacturing the optical element 10 by forming the diffraction structure using the mold patterns by the methods of FIGS. 6 and 7 are described with reference to FIGS. 8A through 8I and 9A through 9G.

FIGS. 8A through 8I schematically and sequentially show a process of forming the diffraction structure on a glass substrate using a silicon film and the mold pattern.

Figure 8A:
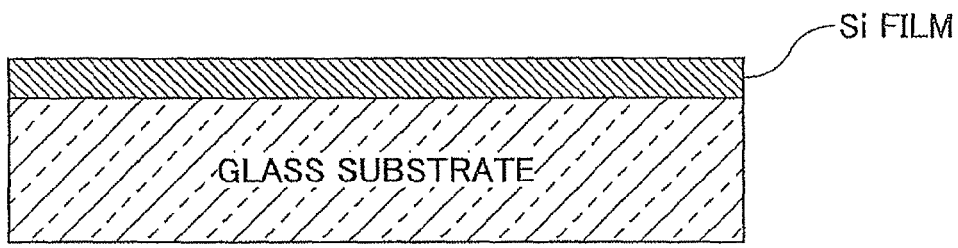
Figure 8B:
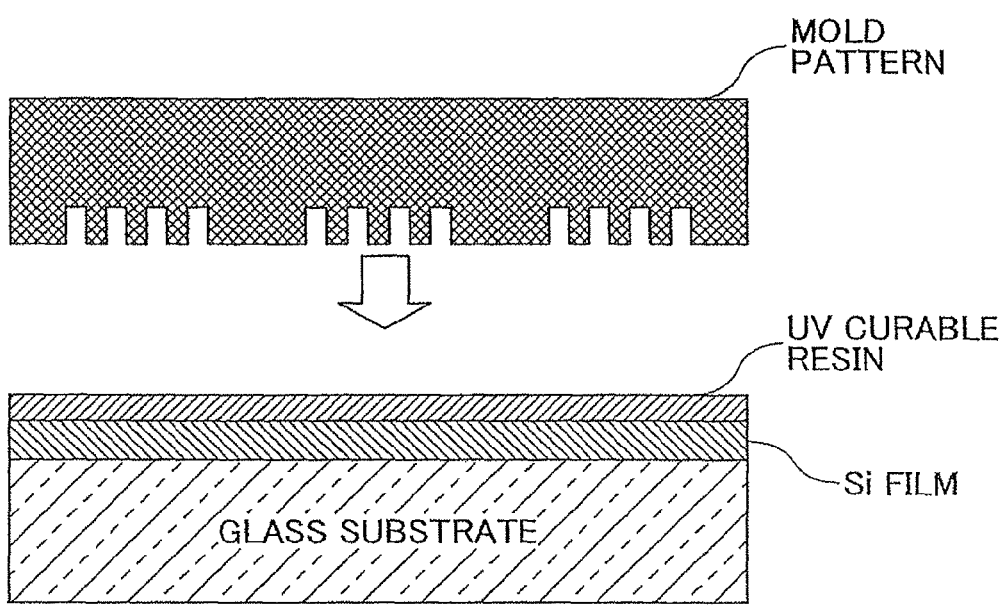

First, as shown in FIG. 8A, a glass substrate is formed and a silicon film (Si film) is formed on the surface of the glass substrate. As a method of forming the silicon film, the sputtering method is performed under the following conditions:
1. Substrate temperature: 70° C. to 100° C.
2. Film forming pressure: (7 to 8)×10-4 Torr
3. Film forming rate: 0.5 to 1.0 Å/sec
4. RF power: 100 to 200 W As shown in FIG. 8B, a UV curable resin is applied to the surface of the Silicon film and the mold pattern is pressed downward. As the UV curable resin, Grandic RC8790 (by DIC Corp.) is used. As the mold pattern, either the silicon pattern or the quartz pattern may be used. However, in nanoimprint process forming a fine structure, it may be preferable to use the quartz pattern due to higher optical transparency compared with the silicon pattern.

Next, as shown in FIG. 8C, an ultraviolet (UV) light is irradiated from the rear side (i.e., from the upper side of FIG. 8C) of the mold pattern to fix the resin. However, when the silicon pattern is used as the mold pattern, the UV light is irradiated from the glass-substrate side (i.e., from the lower side of FIG. 8C).

Next, as shown in FIG. 8D, the mold is removed, so that the fine structure having convex shapes made of the UV curable resin is formed.

Figure 8E:
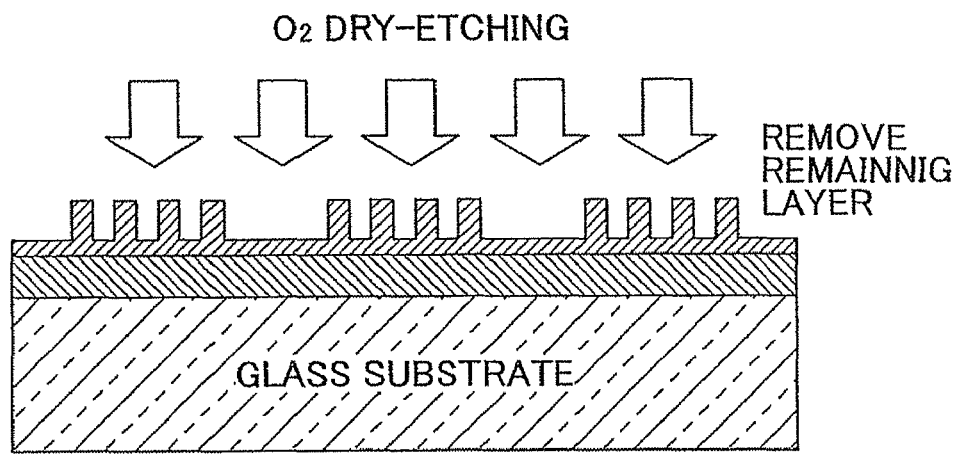

Next, as shown in FIG. 8E, dry-etching is performed to remove the resin until the silicon film is exposed.

Figure 8F:
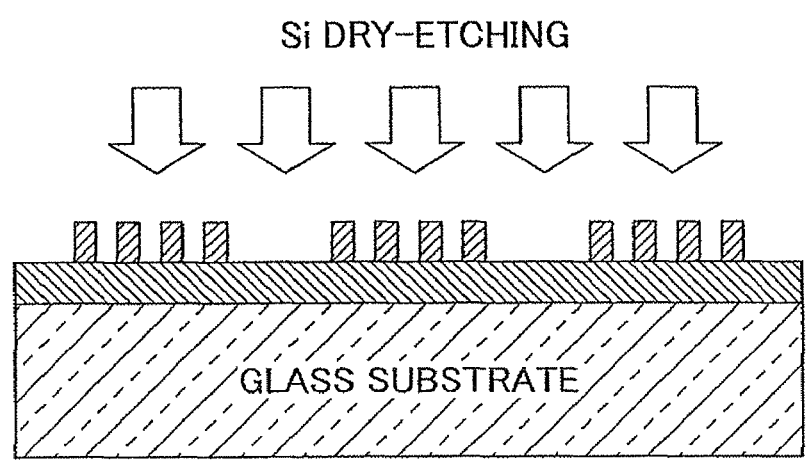

The dry-etching is performed under the following conditions:
1. Gas type: Oxygen gas ($O_2$)
2. Amount of inflow gas: 20 sccm
3. Pressure: 0.4 Pa
4. Resin etching rate: 30 nm/sec
5. Upper bias power: 1 KW
6. Lower bias power: 60 W Next, as shown in FIG. 8F, dry-etching is performed to remove silicon and resin until the glass is exposed.

Figure 8G:
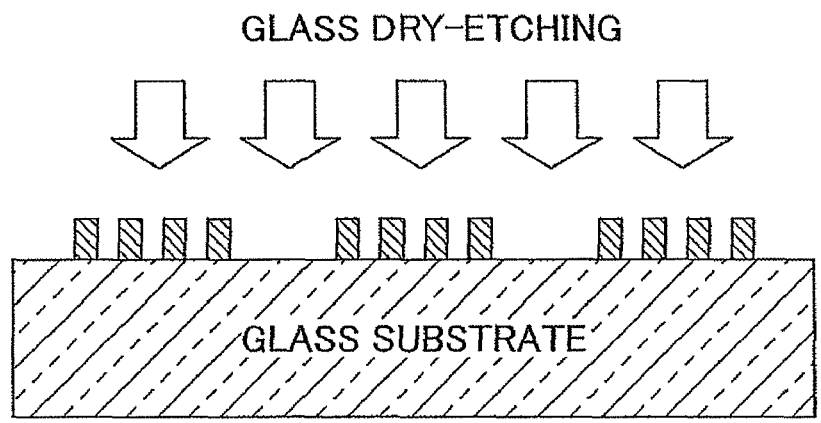

The dry-etching is performed under the following conditions:
1. Gas type: $SF_6$, $CHF_3$
2. Amount of inflow gas
   $SF_6$: 20 sccm
   $CHF_3$: 5 sccm
3. Pressure: 0.3 Pa
4. Resin etching rate: 5 nm/sec
   Silicon etching rate: 30 nm/sec
5. Upper bias power: 1 KW
6. Lower bias power: 50 W Next, as shown in FIG. 8G, dry-etching is performed so that the grooves of the glass have a desired depth.

Figure 8H:
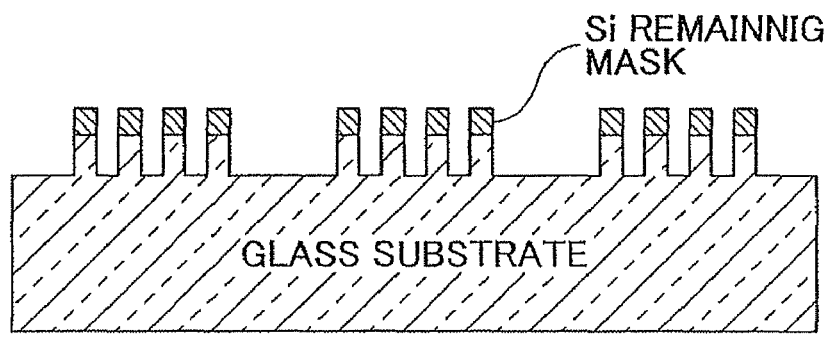

The dry-etching is performed under the following conditions:
1. Gas type: $CHF_3$, Ar
2. Amount of inflow gas
   Ar: 5 sccm
   $CHF_3$: 20 sccm
3. Pressure: 0.3 Pa
4. Silicon etching rate: 4 nm/sec
   Glass etching rate: 12 nm/sec
5. Upper bias power: 1 KW
6. Lower bias power: 400 W Next, as shown in FIG. 8H, the silicon film remaining on the uppermost part is peeled. The silicon mask is wet-stripped using Alkali (KOH) solution.

Figure 8I:
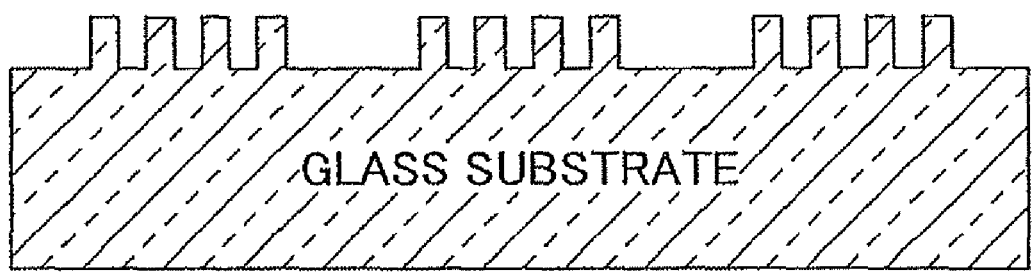

Then, the diffraction element is formed when the pattern as shown in FIG. 8I is formed, where one side of the glass becomes the diffraction element.

FIGS. 9A through 9G schematically and sequentially show a process of forming a $Ti_2O_5$ film on the glass substrate and the diffraction structure made of the $Ti_2O_5$ film is formed using the mold pattern.

Figure 9A:
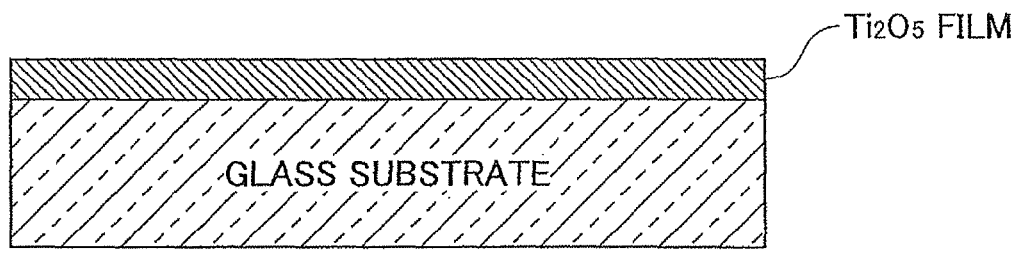
Figure 9B:
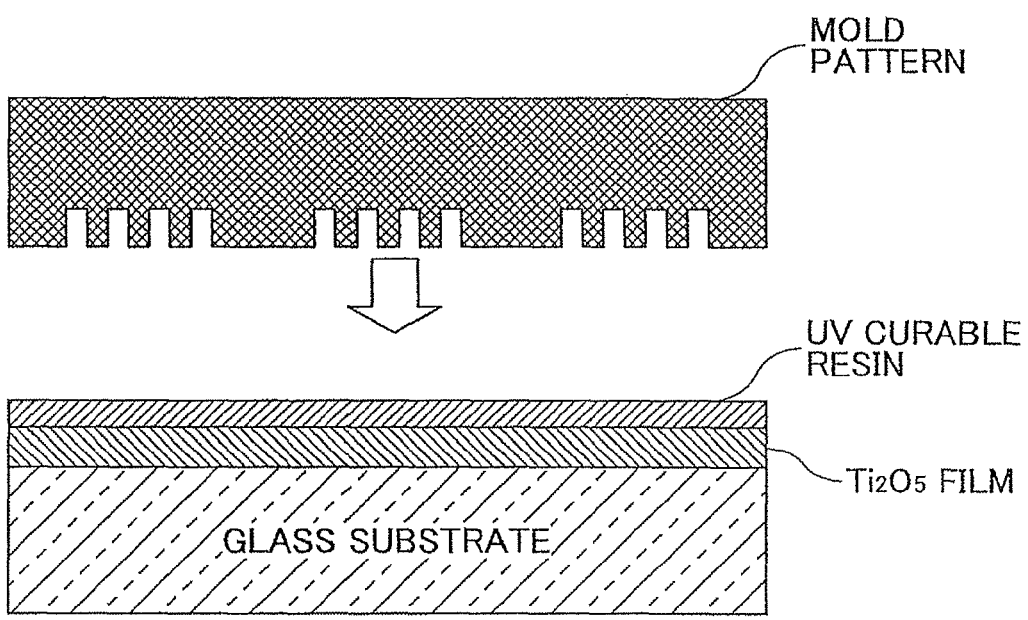

First, as shown in FIG. 9A, a glass substrate is formed and a $Ti_2O_5$ (pentoxide-tantalum) film is formed on the surface of the glass substrate. As a method of forming the $Ti_2O_5$ film, the sputtering method is performed under the following conditions:
1. Substrate temperature: 70° C. to 100° C.:
2. Film forming pressure: (5 to 8)×10-4 Torr
3. Film forming rate: 0.7 to 1.0 Å/sec
4. RF power: 300 to 500 W As shown in FIG. 9B, a UV curable resin is applied to the surface of the $Ti_2O_5$ film and the mold pattern is pressed downward. As the UV curable resin, Grandic RC8790 (by DIC Corp.) is used. As the mold pattern, either the silicon pattern or the quartz pattern may be used. However, in nanoimprint process forming a fine structure, it may be preferable to use the quartz pattern due to higher optical transparency compared with the silicon pattern.

Next, as shown in FIG. 9C, the ultraviolet (UV) light is irradiated from the rear side (i.e., from the upper side of FIG. 9C) of the mold pattern to cure the resin. However, when the silicon pattern is used as the mold pattern, the UV light is irradiated from the glass-substrate side (i.e., from the lower side of FIG. 9C).

Next, as shown in FIG. 9D, the mold is removed, so that the fine structure having convex shapes made of the UV curable resin is formed.

Figure 9E:
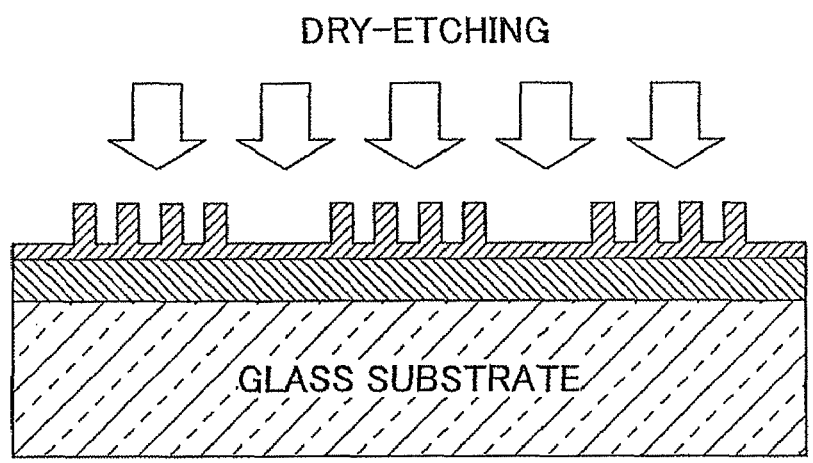

Next, as shown in FIG. 9E, dry-etching is performed to remove the resin until the $Ti_2O_5$ film is exposed.

Figure 9F:
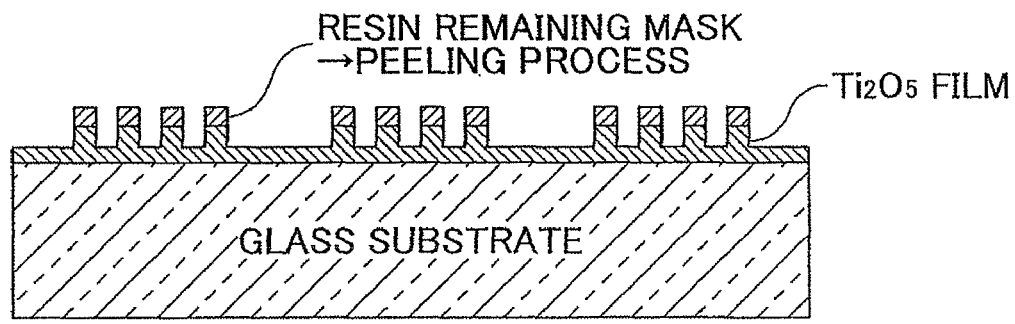

The dry-etching is performed under the following conditions:
1. Gas type: Oxygen gas ($O_2$)
2. Amount of inflow gas: 20 sccm
3. Pressure: 0.4 Pa
4. Resin etching rate: 30 nm/sec
5. Upper bias power: 1 KW
6. Lower bias power: 60 W Next, as shown in FIG. 9F, dry-etching is performed so that the grooves of the $Ti_2O_5$ film have a desired depth.

The dry-etching is performed under the following conditions:
1. Gas type: $CHF_3$, Ar
2. Amount of inflow gas
   Ar: 5 sccm
   $CHF_3$: 20 sccm
3. Pressure: 0.3 Pa
4. $Ti_2O_5$ etching rate: 8 nm/sec
5. Upper bias power: 1 KW
6. Lower bias power: 400 W Next, the resin mask remaining on the uppermost part is removed by dry-etching in oxygen gas (plasma).

Figure 9G:
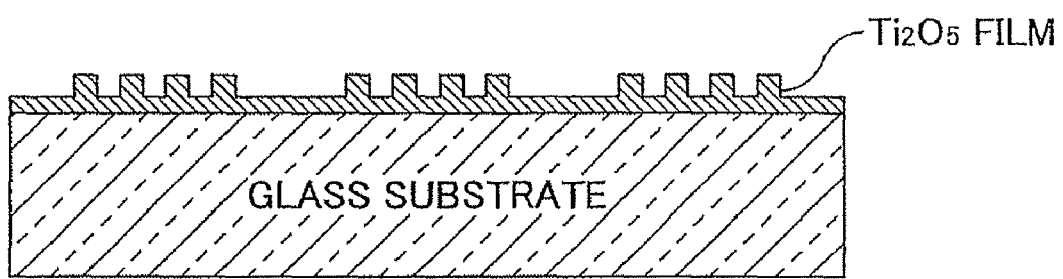

Then, the diffraction element is formed when the pattern as shown in FIG. 9G is formed, where the $Ti_2O_5$ pattern formed on one side of the glass becomes the diffraction element.

Manufacturing Diffraction Grating without Using any Mold Pattern

FIGS. 10A through 10G schematically and sequentially show a process of forming the diffraction structure of a glass substrate without using any mold pattern.

Figure 10A:
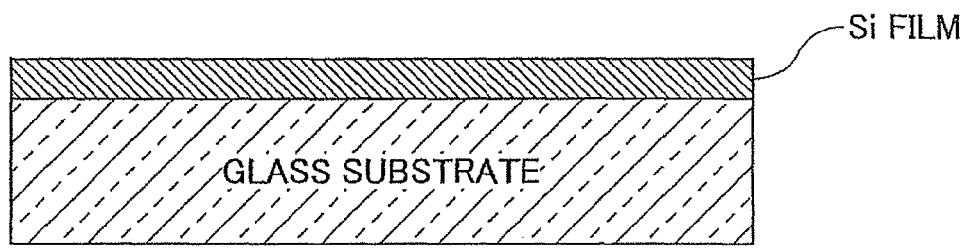
FIGS. 10A through 10G sequentially show still another process of forming the optical element of FIG. 1.
Figure 10B:
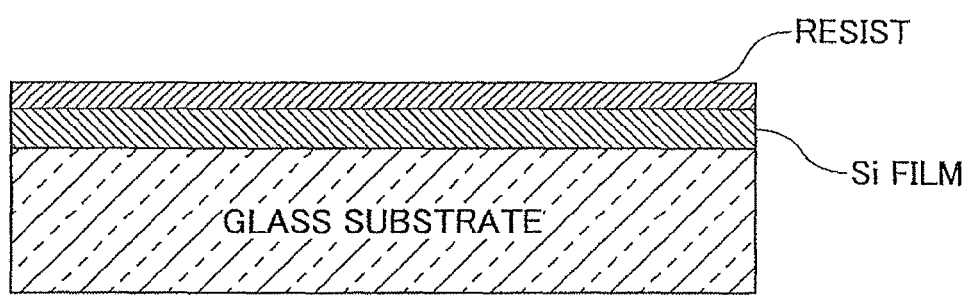
Figure 10C:
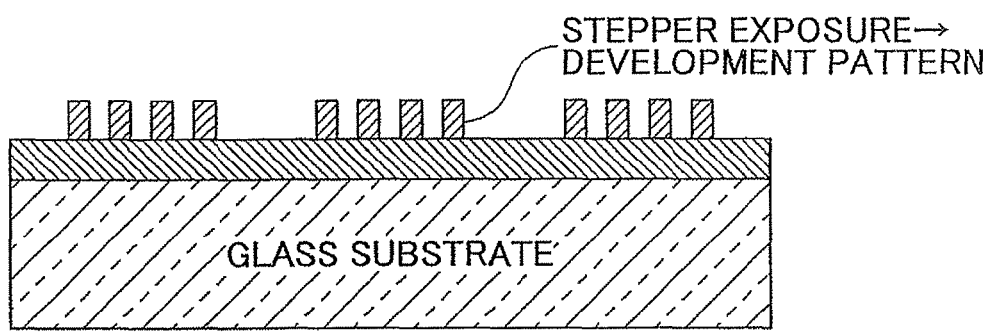

First, as shown in FIG. 10A, a glass substrate is formed and a silicon (Si) film is formed on the surface of the glass substrate. As a method of forming the silicon film, the sputtering method is performed under the following conditions:
1. Substrate temperature: 70° C. to 100° C.
2. Film forming pressure: (7 to 8)×10-4 Torr
3. Film forming rate: 0.5 to 1.0 Å/sec
4. RF power: 100 to 200 W Next, as shown in FIG. 10B, a resist for drawing an electron beam is applied to a silicon film. Next, as shown in FIG. 10C, as a super-fine pattern printing exposure apparatus, an i-line stepper is used. After the exposure, a developing is performed and resist is partially removed to expose the silicon film. The remaining resist pattern is used as a mask pattern later in an etching process.

Figure 10D:
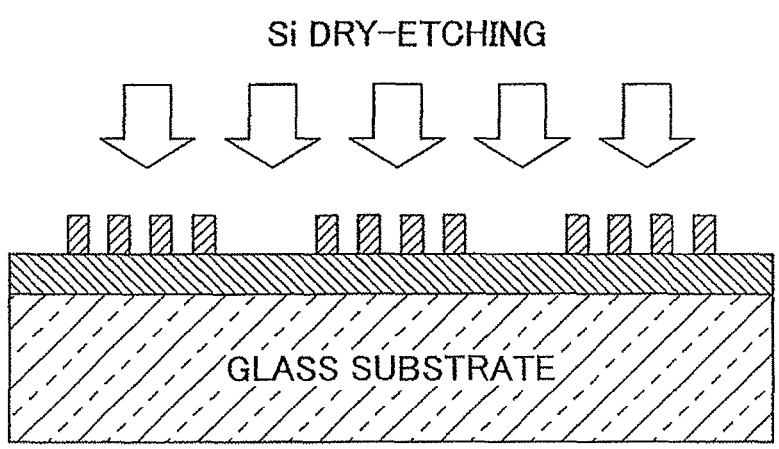

Next, as shown in FIG. 10D, dry-etching is performed to remove silicon until the glass is exposed.

Figure 10E:
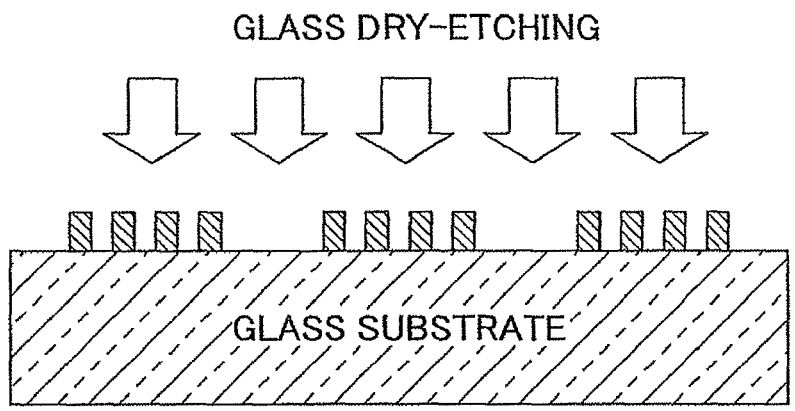

The dry-etching is performed under the following conditions:
1. Gas type: $SF_6$, $CHF_3$
2. Amount of inflow gas
   $SF_6$: 20 sccm
   $CHF_3$: 5 sccm
3. Pressure: 0.4 Pa
4. Silicon etching rate: 30 nm/sec
5. Upper bias power: 1 KW
6. Lower bias power: 50 W Next, as shown in FIG. 10E, dry-etching is performed so that the grooves of the glass have a desired depth.

Figure 10F:
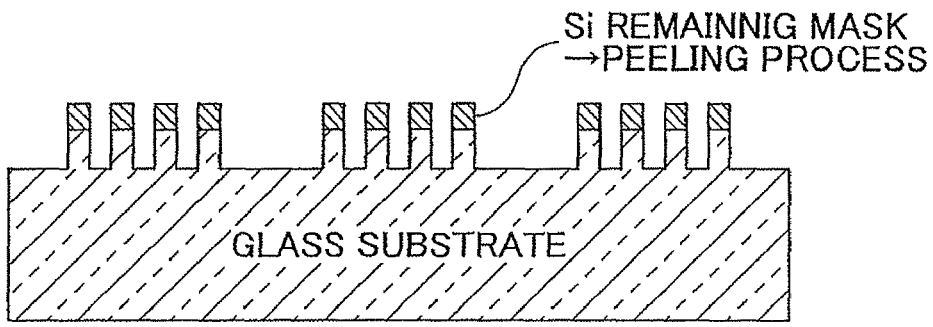

The dry-etching is performed under the following conditions:
1. Gas type: $CHF_3$, Ar
2. Amount of inflow gas
   Ar: 5 sccm
   $CHF_3$: 20 sccm
3. Pressure: 0.3 Pa
4. Glass etching rate: 12 nm/sec
5. Upper bias power: 1 KW
6. Lower bias power: 400 W Next, as shown in FIG. 10F, the silicon film remaining on the uppermost part is peeled. The silicon mask is wet-stripped using Alkali (KOH) solution.

Figure 10G:
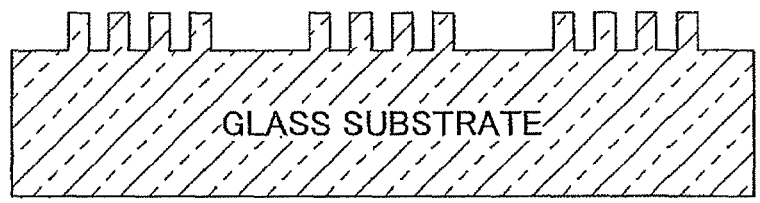

Then, the diffraction element is formed when the pattern as shown in FIG. 10G is formed, where one side of the glass becomes the diffraction element.

The material forming the substrate 11 and the diffraction structure 12 is adequately selected depending on use conditions. For example, when a light having a shorter wavelength and having high energy density is used as the incident light, in view of durability against the light, a glass or an inorganic material may be used as the material of the substrate 11. Further, a material having high transmissivity at the wavelength of the incident light may also be used as the material of the substrate 11. Similarly, the material of the diffraction structure 12 may be selected in consideration of the durability and the purpose of use.

In the embodiment above, a case is described where the diffraction structure 12 is formed on the surface of one side of the substrate 11. However, the present invention is not limited to this configuration. For example, there may be provided an optical element practically having plural optical elements such that the same or a different diffraction structure 12 is also formed on the surface of the other side of the substrate 11.

Figure 11:
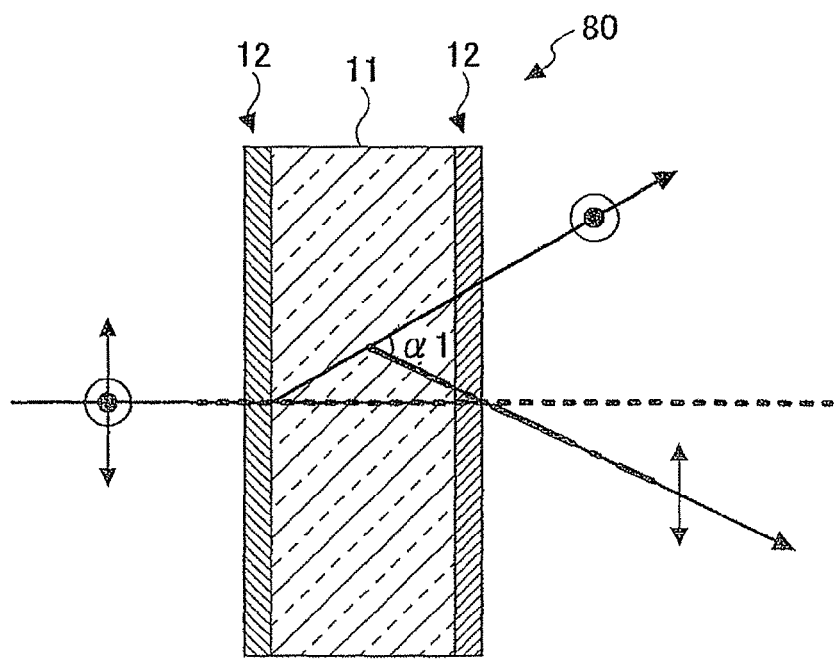
FIG. 11 is an exemplary cross-sectional view of an optical apparatus including plural optical elements according to an embodiment of the present invention.

FIG. 11 shows an example of such an optical element 20. As shown in FIG. 11, the optical element 20 includes two diffraction structures 12 formed on two opposite side surfaces of the substrate 11, so that one of the diffraction structures 12 diffracts only the P-polarization component of the incident light and transmits (without diffracting) the S-polarization component of the incident light and the other diffraction structures 12 diffracts only the S-polarization component of the incident light and transmits (without diffracting) the P-polarization component of the incident light. By forming the groove extending directions of sub-wavelength convexo-concave structures and setting the filling factors so that the diffraction structures 12 have different diffraction directions from one another as shown in FIG. 11, the optical element 20 may serve as an optical element capable of diffracting both of the S-polarization component and the P-polarization component of the incident light and increase a separation angle "$\alpha 1$" between those diffraction directions. As described above, by using plural optical elements so that a light having traveled through one optical element is incident to another optical element, an element apparatus (optical element) having various configurations (functions) may be obtained as described below with reference to FIG. 15.

Figure 12:
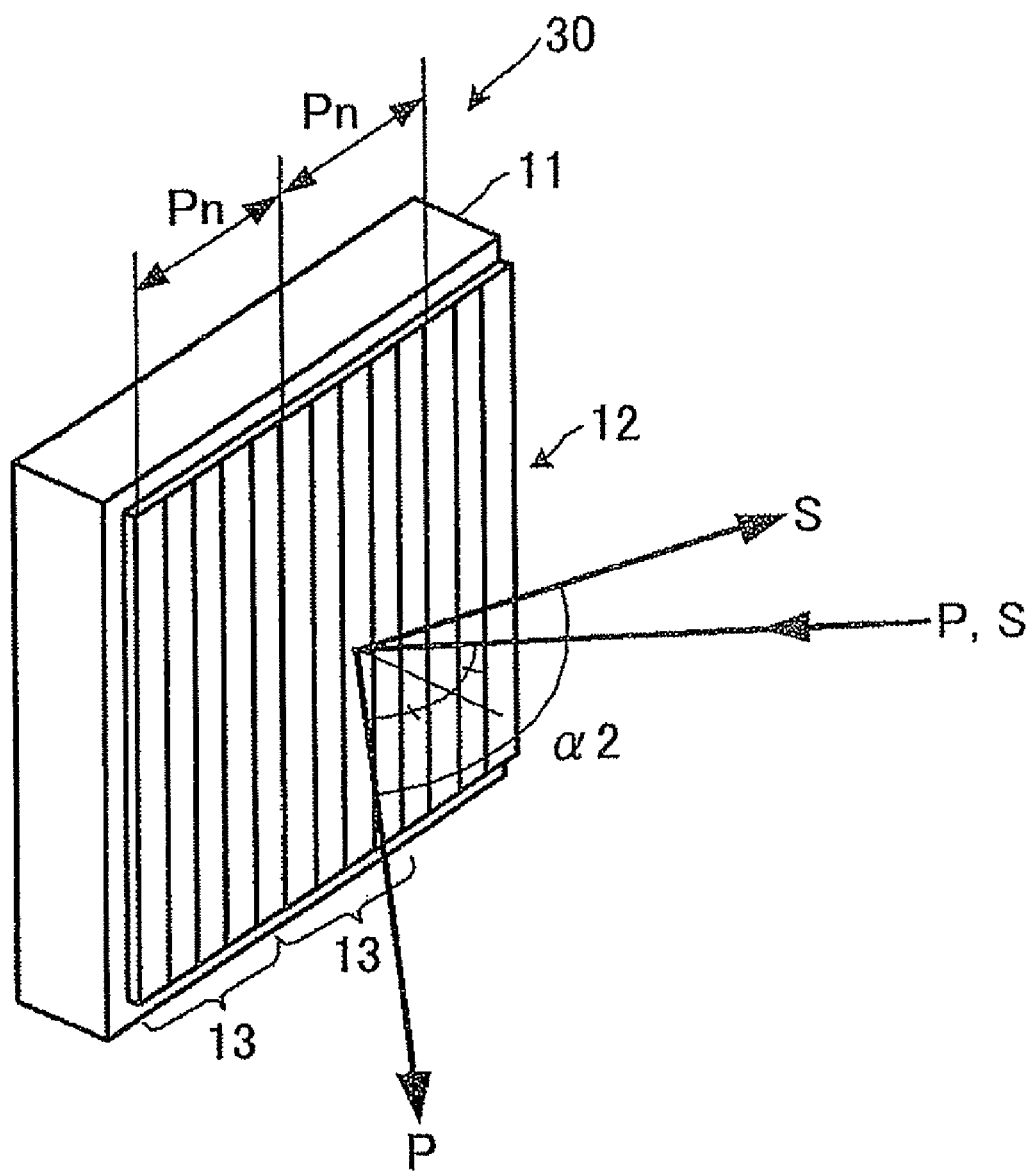
FIG. 12 is a schematic perspective drawing showing a reflective optical element according to an embodiment of the present invention.

The optical elements 10 and 20 and diffraction structure 12 described above are a transmissive element in which an incident light transmits through the elements and structure, respectively. However, a reflective optical element 30 according to an embodiment of the present invention as shown in FIG. 12 may also be provided. In this optical element 30, a reflection film for reflecting the incident light is included, and the reflection film may be formed by an adequate method such as the sputtering method or the like.

In the optical element 30 of FIG. 12, there is provided the reflection film (not shown) between the substrate 11 and the diffraction structures 12; therefore, among the random polarization directions of the incident light, the P-polarization component of the incident light transmits (without being diffracted) through the diffraction structures 12 and is specular-reflected from the reflection surface of the reflection film and the S-polarization component of the incident light diffracts to be diffraction-reflected to the same side as the incident side of the optical element 30. Since the reflection film is disposed between the substrate 11 and the diffraction structures 12 as a so-called base of the diffraction structures 12, the S-polarization component of the incident light is subject to the diffraction twice to increase the diffraction angle "$\alpha 2$". The reflection film may be formed on the surface of the diffraction structures 12. Further, for example, the reflective optical element 30 may be used to substitute for the diffraction structures 12 disposed on the right-hand side of the optical element 20 shown in FIG. 11, so that the reflective optical element 30 may be used with the transmissive optical element. Further, it may become possible to arbitrarily determine (adjust) a ratio of intensity of each polarization component of the incident light and/or the direction of diffraction-diffracted light by adjusting the reflectivity of the reflection film, changing the configuration of the diffraction structures 12 and the like depending on the purpose of use.

In the following, with reference to FIGS. 13 through 16, variable modifications using the optical element 10 are described. However, the present invention is not limited to those modifications. Further, the optical elements 20 and 30 may also be usefully employed in accordance with the functions to be necessary for the purpose of use.

Figure 13:
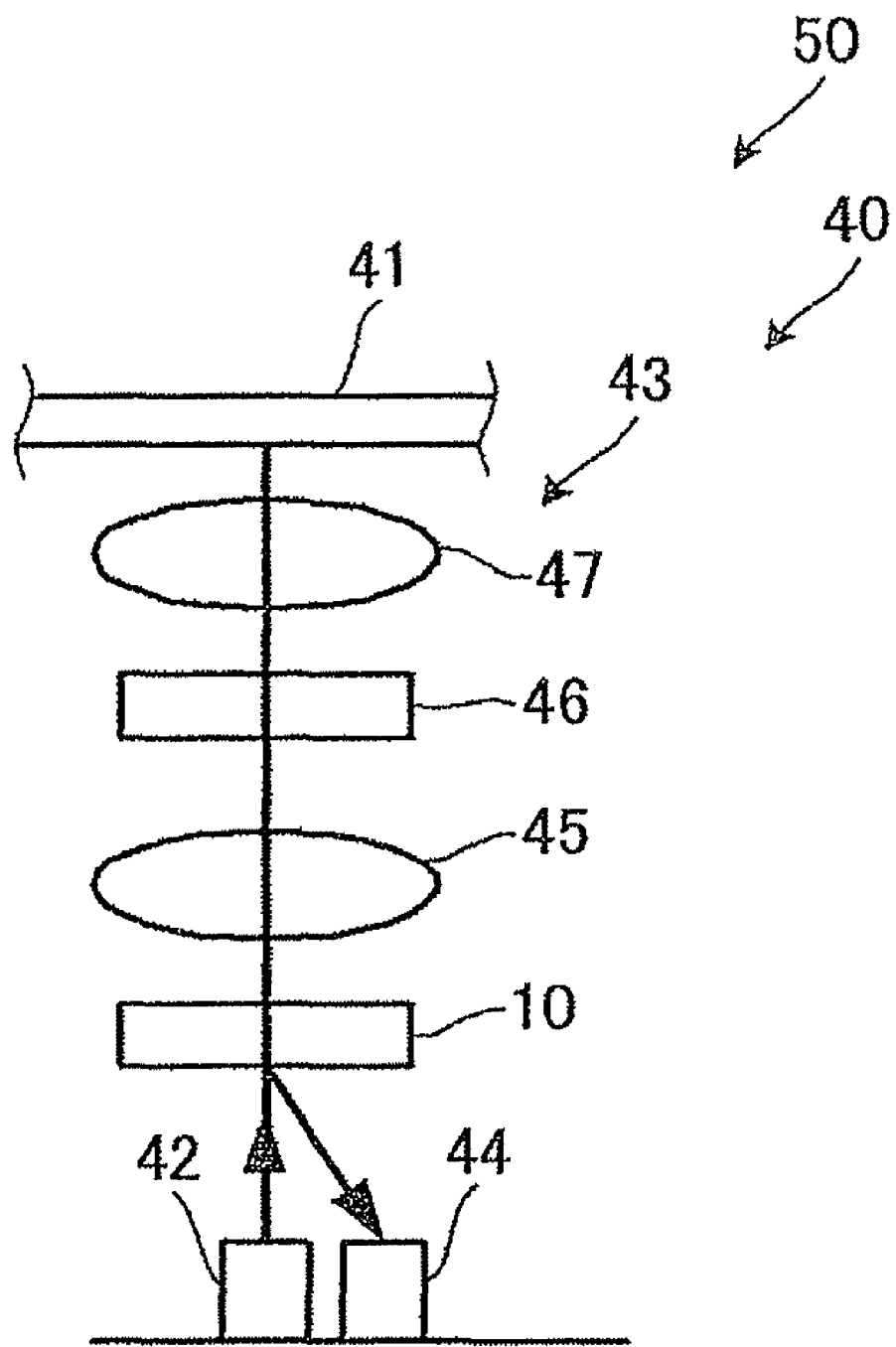
FIG. 13 is a schematic front view showing an optical pickup including the optical element of FIG. 1 and a part of an optical information processing apparatus including the optical pickup.

FIG. 13 shows a part of an optical information processing apparatus 50 capable of processing information by recording the information on a recoding medium 41 serving as an optical recoding medium such as an optical disk and reading the information recorded on the recording medium 41. To that end, the optical information processing apparatus 50 includes an optical pickup 40.

As shown in FIG. 13, the optical pickup 40 includes a semiconductor laser 42 serving as a light source, an optical pickup optical system 43 guiding a laser light emitted from the semiconductor laser 42 to the recording medium 41, and a light receiving element 44 receiving the laser light guided to the recording medium 41 through the optical pickup optical system 43 and then reflected from the recording medium 41 and transmitted through the optical pickup optical system 43 again.

As shown in FIG. 13, the optical pickup optical system 43 includes the optical element 10 serving as the polarization separation element capable of linearly polarizing the laser light emitted from the semiconductor laser 42, a collimeter lens 45 collimating the laser light transmitted through the optical element 10, a quarter wavelength plate 46 converting the collimated laser light by the collimeter lens 45 into a circularly polarized light, and an objective lens 47 collecting the laser light transmitted through the quarter wavelength plate 46 on the recording medium 41. The optical pickup optical system 43 records and reproduces information on and from the recording medium 41 by collecting the laser light on the recording medium 41.

The laser light reflected from the recording medium 41 travels through the objective lens 47 again. Then after being converted into the circularly polarized light orthogonal to the laser light radiated to the recording medium 41, the laser light transmits through the collimeter lens 45 and is incident to the optical element 10 again to be diffracted in the direction different from the direction of the laser light from the semiconductor laser 42 to be guided into the light receiving element 44. Further, a light receiving optical system such as a condensing lens may be provided between the optical element 10 and the light receiving element 44.

The light receiving element 44 forms (generates) an information signal based on the information from the recording medium 41 and a servo signal to operate an actuator (not shown) to move the objective lens 47. As the servo signal, it is generally known that a focusing error signal in the Astigmatism method, a tracking error signal in the Push-Pull method and the like are generated.

As described above, the optical element 10 according to an embodiment of the present invention serves as a light path branching element in the optical pickup optical system 43 with respect to the laser light emitted from the semiconductor laser 42 and the laser light reflected from the recording medium 41 to be guided to the light receiving element 44, so that the optical element 10 serves as an isolator preventing the return of the laser light to the semiconductor laser 42 again.

As described above, when the optical element 10 is used as the polarization separation element for the optical pickup 40, the size of the optical system may be smaller than that of the polarization separation element having a cubic shape and having the triangular prisms cemented together. Especially, to be integrated into recent laptop PCs, there is a strong demand for a compact optical pickup optical system, therefore it is important to reduce the size of the optical element. To that end, as described above, the optical element 10 according to an embodiment of the present invention may be used as the polarization separation element capable of diffracting mainly to a specific order; therefore, it may become possible to provide (achieve) a high efficiency polarization optical system as the optical pickup.

Further, the optical element 10 according to an embodiment of the present invention may also be used as an optical pickup for recording information in an optical recording medium using a holography technique which has been attracting more and more attention lately. As the optical pickup employing the holography technique, the optical element 10 may be used as the polarization separation element separating the incident light into two linearly polarized lights orthogonal to each other travelling in the directions other than the optical axis of the incident light.

Further, the optical element 10 according to an embodiment of the present invention may also be used in an optical system or the like using a so-called twin laser chip including semiconductor chips having different wavelengths from each other integrated into a single package. More specifically, the optical element 10 according to an embodiment of the present invention may also be used as a polarization-selective light path correction means in which the polarization direction of one of the laser lights having a different wavelength from the other is orthogonal to that of the other laser light using a wavelength-selective half-wavelength plate, so that the two laser lights have the same optical axis.

Figure 14:
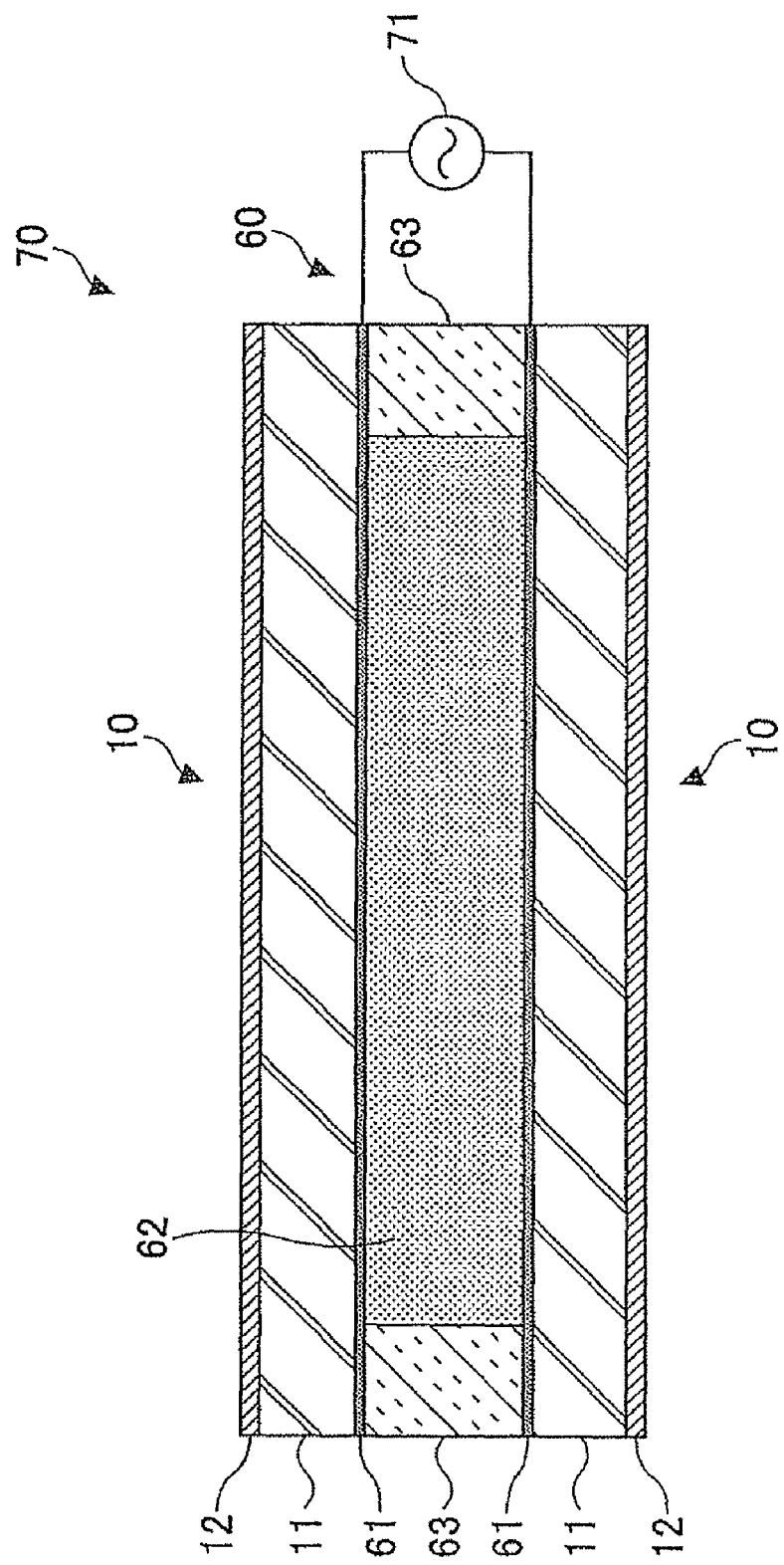
FIG. 14 is a schematic cross-sectional view of an optical attenuator including the optical element of FIG. 1.

FIG. 14 shows a liquid crystal element 60 in which efficiency of straight transmitted light is variable and a voltage-variable optical attenuator 70 using the liquid crystal element 60.

As shown in FIG. 14, the liquid crystal element 60 includes a pair of substrates 61 each having an electrode, a liquid crystal layer 62, and sealing members 63 forming the liquid crystal layer 62 by enclosing the liquid crystal of the liquid crystal layer 62 in between the pair of substrates 61.

The optical attenuator 70 includes the liquid crystal element 60, a voltage application section 71 applying a voltage between the pair of substrates 61 to control the alignment of the liquid crystal forming the liquid crystal layer 62, and optical elements 10 provided on both sides of the liquid crystal element 60.

In such an optical attenuator 70, when two linear polarized lights having polarization directions orthogonal to each other are incident to the liquid crystal element 60, the two linear polarized lights transmit through different transmission paths in the liquid crystal element 60 based on the polarization directions thereof determined by one optical element 10 having a polarized diffraction structure serving as a first polarized beam splitter. Further, when the liquid crystal layer 62 has a specific retardation value, each of the above two linear polarized lights incident to the other optical element 10 having a polarized diffraction structure serving as a second polarized beam splitter is emitted in the same transmission direction as that of the corresponding linear polarized light having been incident to the liquid crystal element 60.

Therefore, in the optical attenuator 70, when a voltage is applied to the liquid crystal element 60 by the voltage application section 71 so that the two linear polarized light are emitted in the same transmission directions as those of the linear polarized lights having been incident in the liquid crystal element 60, the amount of a straight transmission light is largest; but when the transmission direction of a light is shifted from the incident direction of the light due to the diffraction, the amount of a straight transmission light is attenuated. In such a case, the liquid crystal element 60 may serve as an attenuation means for attenuating a light transmitted through the optical elements 10.

As described above, when the optical elements 10 are used in the optical attenuator 70, the above described effect (function) may be easily obtained by forming the diffraction structures 12 on the substrates 11, the diffraction structures 12 being for performing polarization branching, and the substrates 11 sandwiching the liquid crystal layer 62; thereby enabling reducing the number of parts to be included in the optical attenuator 70.

Figure 15:
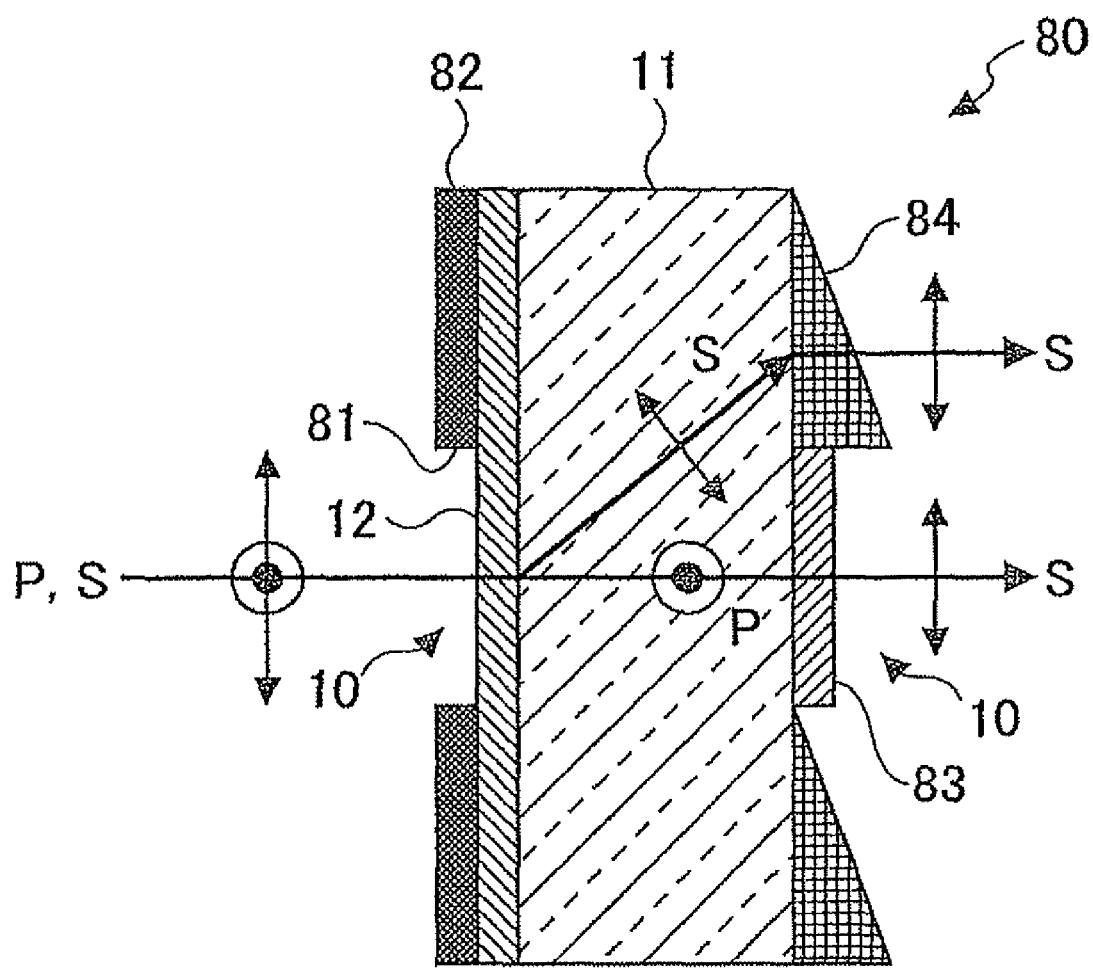
FIG. 15 is a schematic cross-sectional view of a polarization conversion element including the optical element of FIG. 1.

FIG. 15 shows a polarization conversion element 80 capable of aligning various directions of a random polarization light to one direction. As shown in FIG. 15, the polarization conversion element 80 includes the optical element 10, a light blocking member 82 having an opening section 81 through which an incident light is incident to the optical element 10, a half wavelength plate 83 formed on the substrate on the light emitting side of the optical element 10 and in the position opposite to that of the opening section 81, and prisms 84 formed on the substrate so as to sandwich the half wavelength plate 83.

In the polarization conversion element 80, a light flux having random polarization directions transmitted though the opening section 81 is incident to the diffraction structure 12. Then, the P-polarization component of the incident light transmits straightly as the zero-order diffracted light without being diffracted and the S-polarization component of the incident light is diffracted and separated as the first-order diffracted light. The P-polarization component of the incident light transmitted straightly through the diffraction structure 12 further transmits through the optical element 10, and the polarization direction of the P-polarization component is changed into the polarization direction of the S-polarization component by the half wavelength plate 83. The half wavelength plate 83 serves as a conversion element converting the polarization direction of the polarization component of the incident light transmitted through the optical element 10. On the other hand, the S-polarization component incident to the diffraction structure 12 is diffracted by the diffraction structure 12 and polarized by the prism 84 to be emitted as the light having the same S-polarization component and transmitted in the direction same as the transmission direction of the light flux having passed (transmitted) through the half wavelength plate 83. Therefore, the prism 84 serves as an optical member which is a polarization member to change the emission direction of a light flux so as to be substantially parallel to the incident direction of the light flux incident to the polarization conversion element 80. By doing this, the polarization conversion element 80 may align various directions of a random polarization light incident to the polarization conversion element 80 to one polarization direction of the S-polarization component of the incident light when the incident light is emitted from the polarization conversion element 80.

Further, instead of using the half wavelength plate 83 and the prism 84, the polarization conversion element 80 may include a diffraction structure 12 having the same functions of the half wavelength plate 83 and the prism 84. In this case, the polarization conversion element 80 may be provided simply by forming the diffraction structure 12 on each of both side surfaces of a single glass substrate 11.

By using the optical element 10 in the polarization conversion element in a manner as described above, a highly-accurate polarization conversion element having a simple configuration may be provided.

Figure 16:
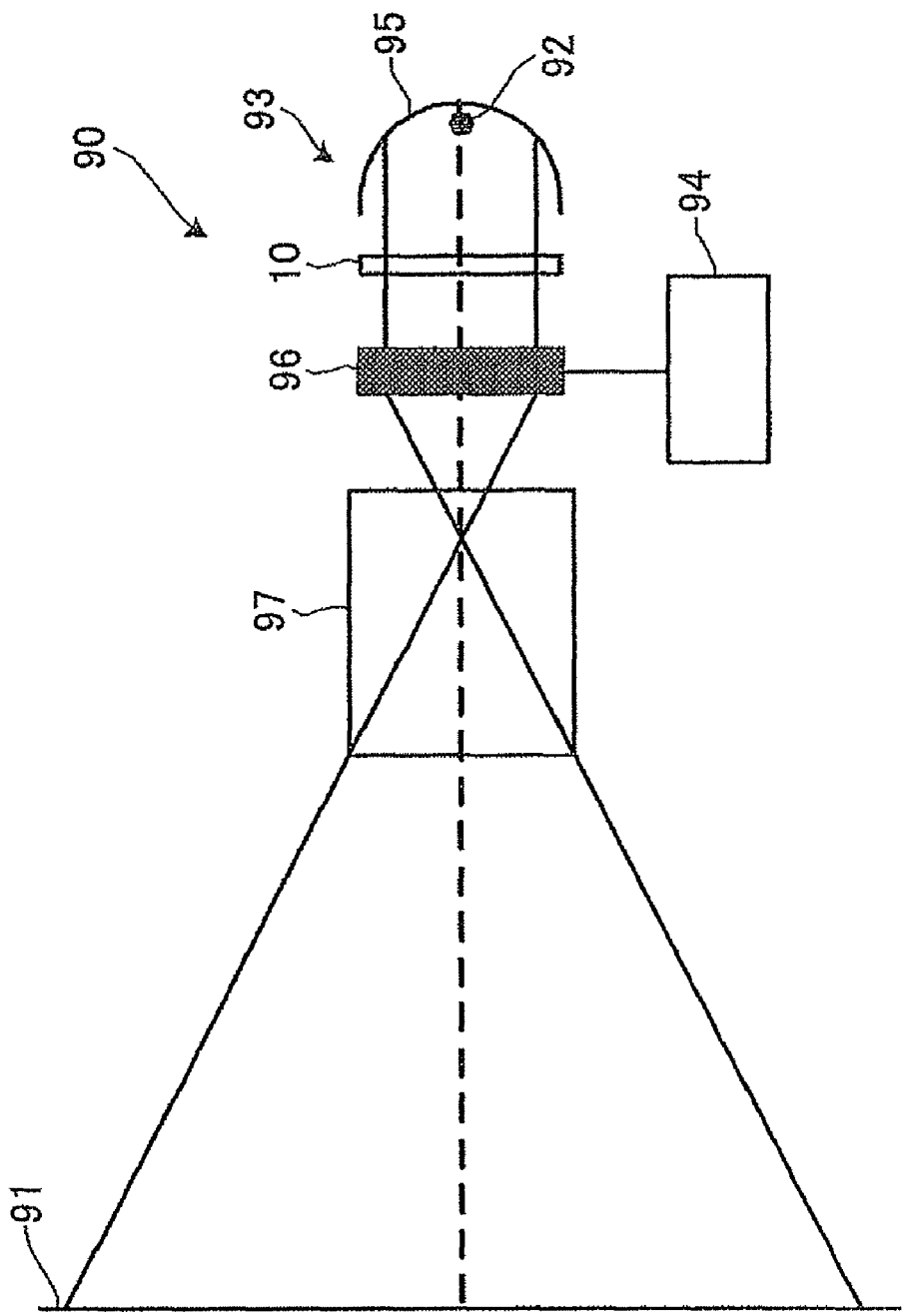
FIG. 16 a schematic drawing showing a projector optical system including the optical element of FIG. 1 and a part of an optical apparatus including the projector optical system.

FIG. 16 schematically shows a part of a projector 90 which is an optical apparatus called a projecting apparatus as an image forming apparatus called a projecting body forming an image by projecting a predetermined image on a screen. As shown in FIG. 16, the projector 90 includes a light source section 92 emitting a light flux having the P-polarization component and the S-polarization component, a projector optical system 93 for projecting an image on a screen 91 using the light flux emitted from the light source section 92, and an image processing section 94 such as a computer for processing an image to be projected on the screen 91 by the projector optical system 93.

The projector optical system 93 includes the optical element 10 to be provided in between the light source section 92 and the screen 91, a reflection mirror 95 for reflecting a part of the light flux emitted from the light source section 92 so as to change the light transmission direction from the direction from the side of the optical element 10 to the reflection mirror 95 into the direction from the reflection mirror 95 to the side of the optical element 10, a liquid crystal panel 96 serving as an optical modulation means for modulating the light flux emitted from the optical element 10 based on a given image signal and made of a liquid crystal element or the like, and a projection optical system 97 having a function of forming an image on the screen 91 based on the light flux transmitted through the liquid crystal panel 96, so that the projector optical system 93 projects the light flux modulated by the optical element 10 on the screen 91 to form an image adjusted by the liquid crystal panel 96 on the screen 91. In this case, the optical element 10 serves as a key part of the projector optical system 93.

Further, the projector optical system 93 may selectively include any of the above various optical elements 10, 20, and 30, the optical attenuator 70, the polarization conversion element 80 and the like. The projector 90 may selectively include any of the above various optical elements 10, 20, and 30, the optical pickup 40, the optical information processing apparatus 50, the optical attenuator 70, the polarization conversion element 80 and the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, in the above embodiment, a case is described where five (5) sub-wavelength convexo-concave structures are included in each periodic structure. However, the present invention may be achieved as long as the number of the sub-wavelength convexo-concave structures to be included in each periodic structure is three (3) or more. When there are five (5) sub-wavelength convexo-concave structures in a periodic structure, the periodic structure may be equivalent to an optical element including a stepped prism having five (5) bumps.

Figure 17:
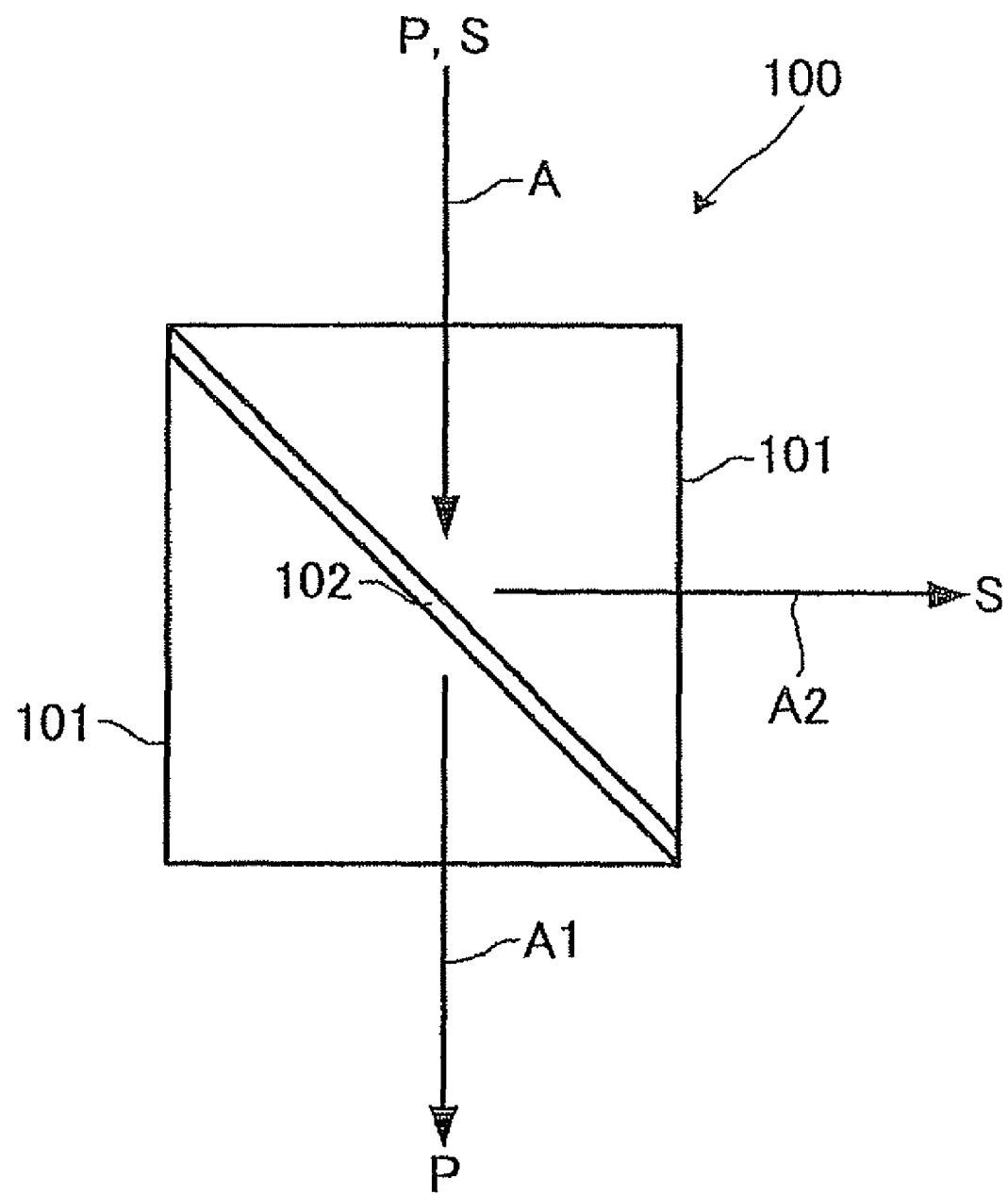
FIG. 17 is a front view showing an example of a conventional optical element.
Figure 18:
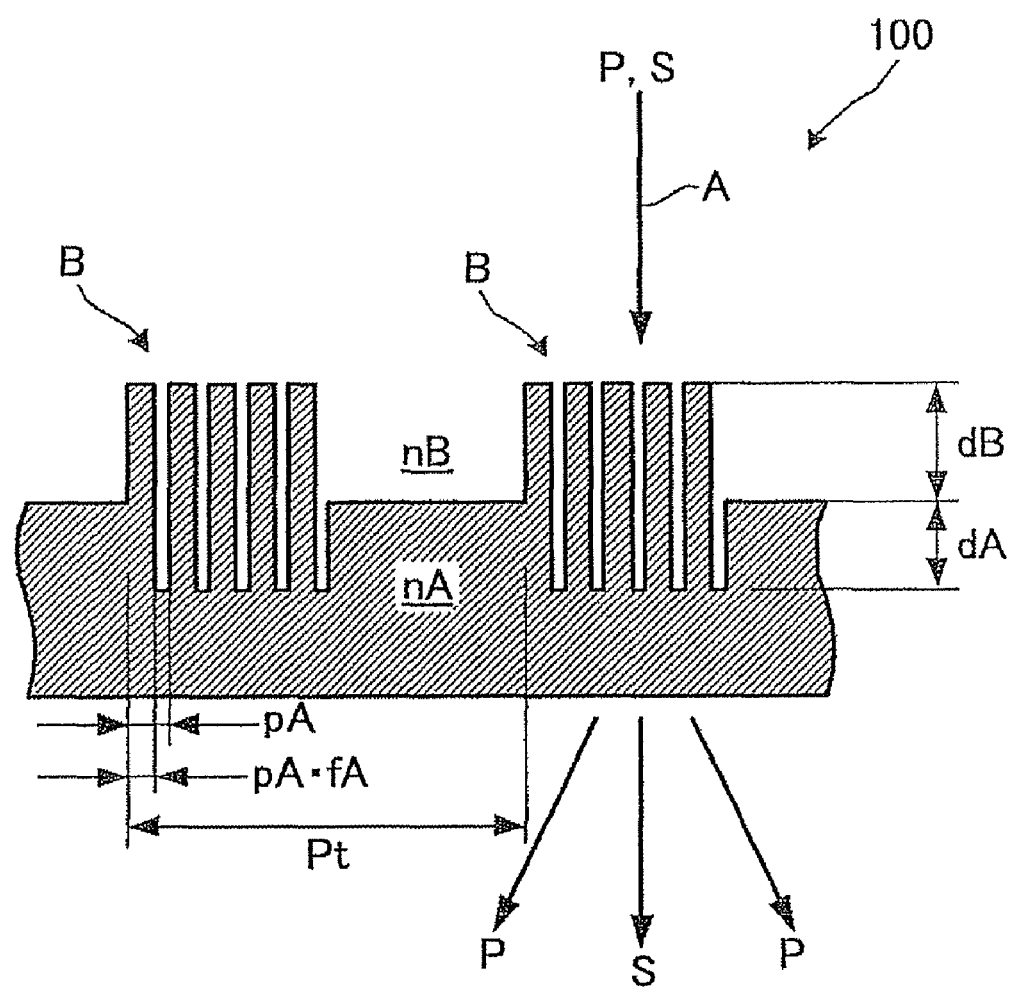
FIG. 18 is a cross-sectional view of another example of a conventional optical element.
Figure 19:
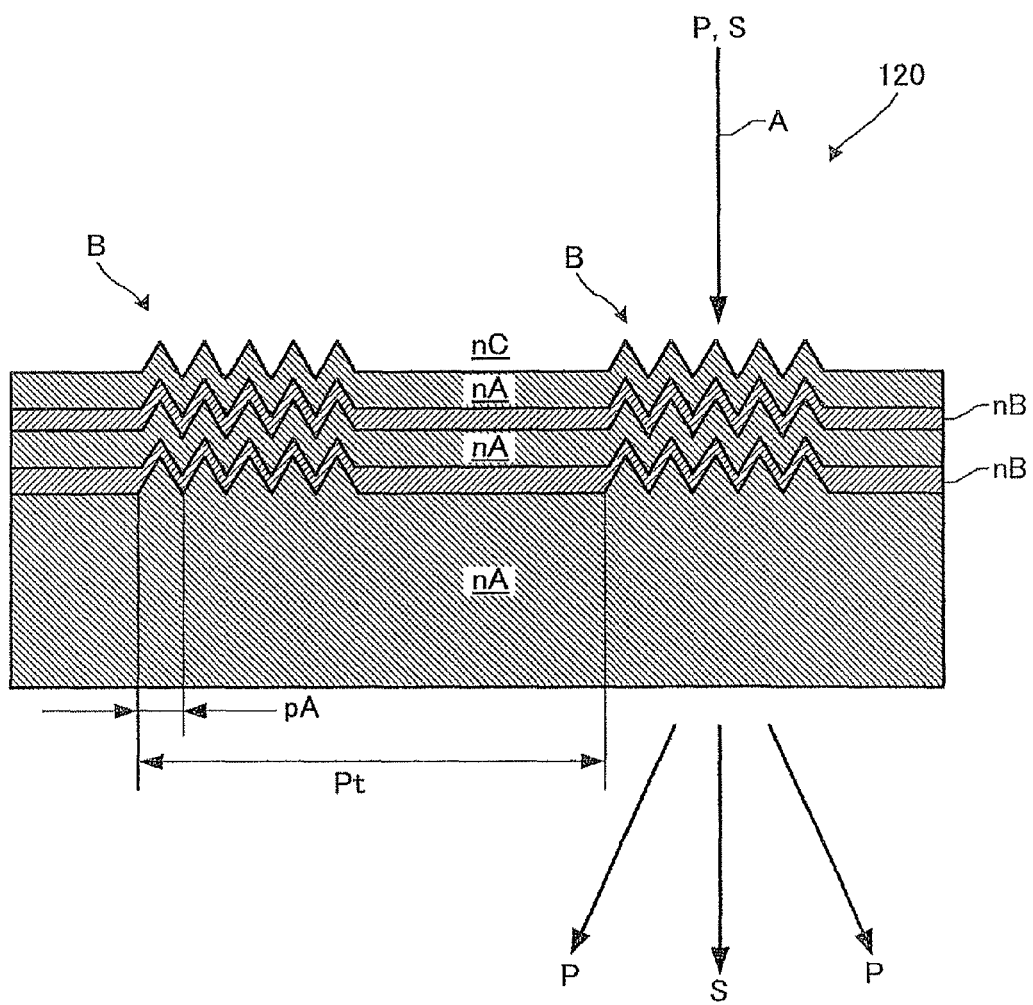
FIG. 19 is a cross-sectional view of still another example of a conventional optical element.
Figure 20A:
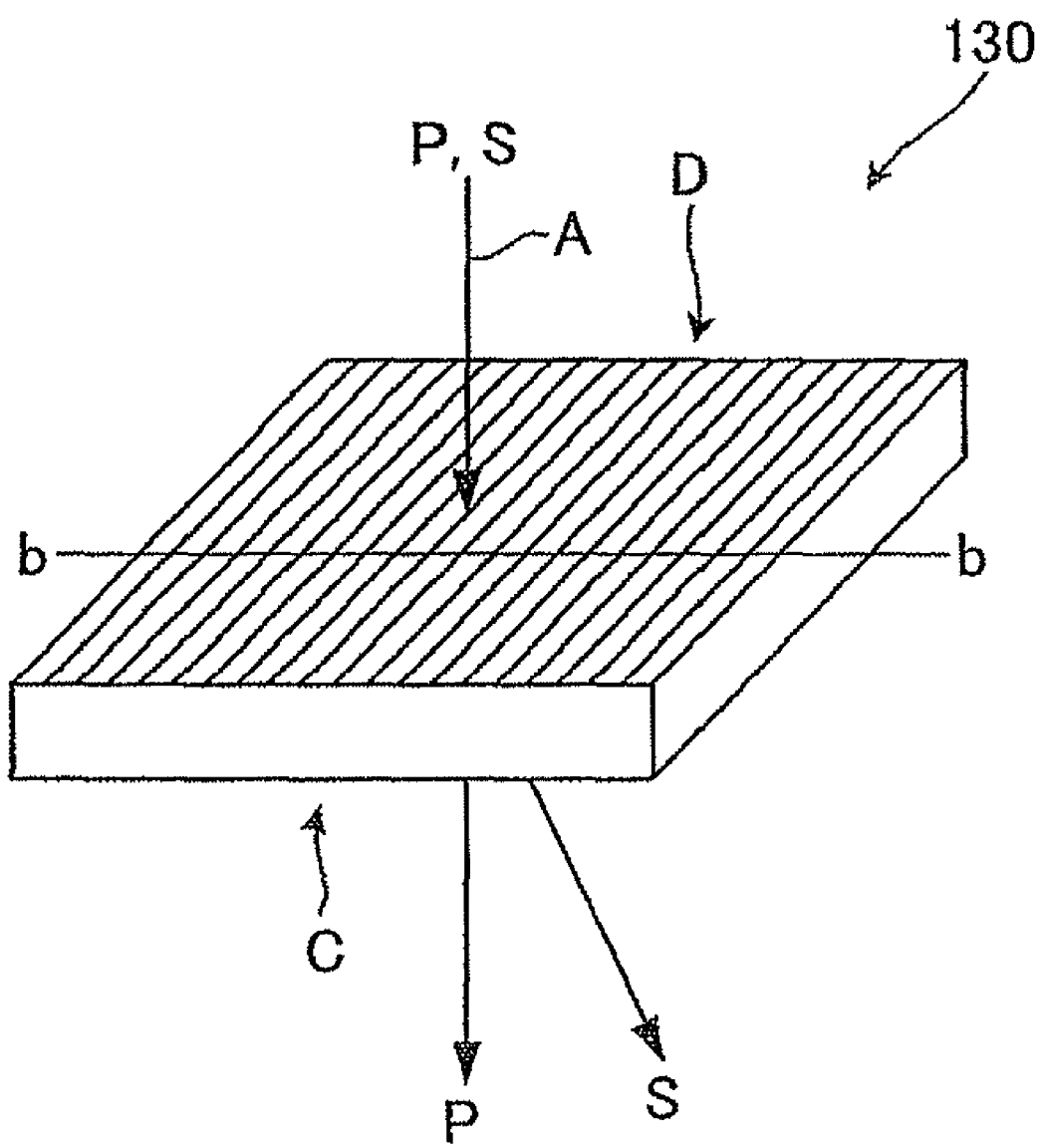
FIGS. 20A and 20B are schematic drawings showing still another example of a conventional optical element.
Figure 20B:
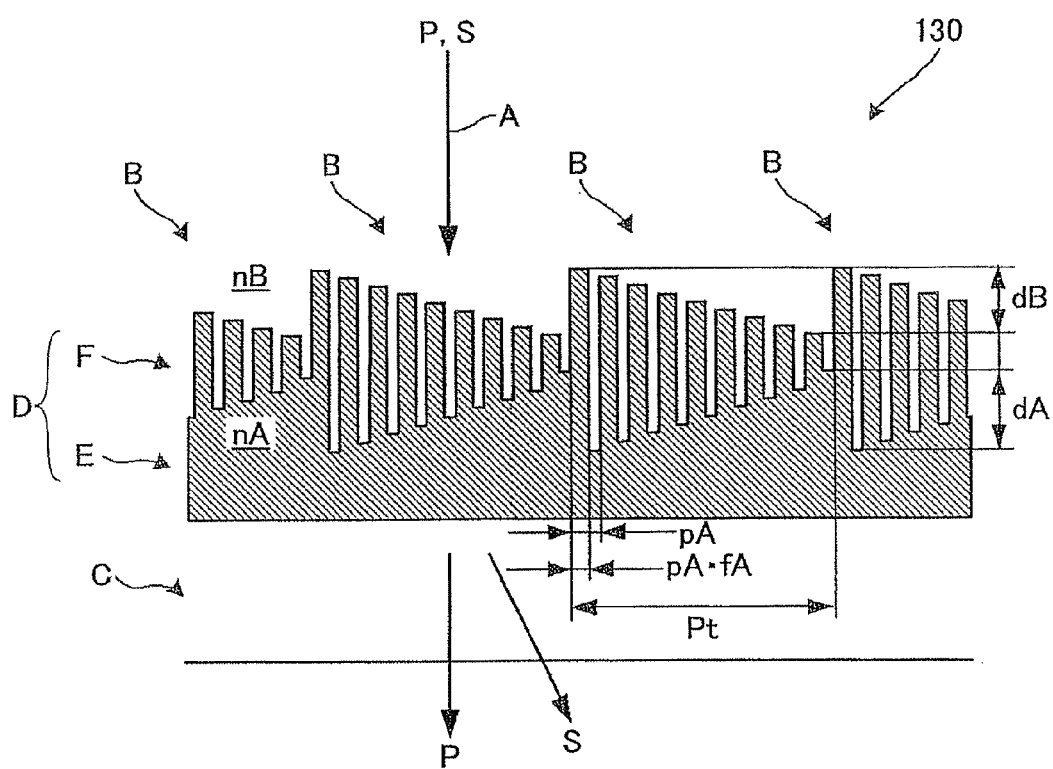

A maximum diffraction efficiency of a specific order diffracted light is determined based on the number of types of the sub-wavelength convexo-concave structures; namely, the intensity of the diffracted light is determined based on the setting of a specific groove depth. In other words, the more the number of the types of the sub-wavelength convexo-concave structures (i.e., the more the number of the areas of the sub-wavelength convexo-concave structures), the larger the diffraction efficiency becomes. Further, the more the number of the types of the sub-wavelength convexo-concave structures included in a optical element, the closer to the shape of the polarization separation element shown in FIG. 17 having a triangular shape of prisms equivalent to the optical element. Further, the numbers of the sub-wavelength convexo-concave structures in the periodic structures are not necessarily equal to each other.

Further, the pitches of the periodic structures are not necessarily the same as each other and may be different from each other. In this case, the shortest pitch is required to be equal to or greater than the wavelength of the incident light.

Further, by making the diffraction angles of the polarization components to be diffracted different from each other among the period structures and setting the diffraction angles so as to be directed to their specific directions and by making the periodic structures having the pitches different from each other by setting the diffraction angle of the periodic structures so as to focus the lights diffracted by the periodic structures into a single point, an optical element or a diffraction element having a lens function may be provided.

In the above embodiment of the present invention, a case is described where the diffraction structure has a straight pattern aligned to a predetermined groove extending direction in the optical element. However, the diffraction structure may have a curved pattern. By having such a curved pattern, the optical element may have a lens function or the like or may be used for aberration correction or the like.

Further, in the above embodiment of the present invention, a case is described where the diffraction structure is formed on a flat plate. However, the present invention is not limited to this, and the diffraction structure may be formed on a curved plate.

An optical apparatus including an optical element according to an embodiment of the present invention may include not only the projector described above but also a communication apparatus to be used in an optical fiber communication or the like, an image forming optical system, an image forming apparatus such as an imaging apparatus, a copier, a printer and the like having the image forming optical system and the like.

The effects described in the embodiments of the present invention are examples of the most preferable effects generated from the present invention; and the effects of the present invention is not limited to the effects described in the embodiments of the present invention.

The present application is based on and claims the benefit of priority of Japanese Patent Application No. 2009-006527, filed on Jan. 15, 2009, the entire contents of which are hereby incorporated herein by reference.

The invention claimed is:

1. An optical element comprising:
   three or more sub-wavelength convexo-concave structures having pitches less than a wavelength of an incident light incident to the optical element and having groove depths equal to each other; and
   a periodic structure having the three or more sub-wavelength convexo-concave structures, the pitch of the periodic structure greater than the wavelength of the incident light,
   wherein a predetermined polarization direction of the incident light is diffracted mainly into a specific order, and
   wherein groove extending directions of the three or more sub-wavelength convexo-concave structures are formed so as to be different from each other and filling factors of the three or more sub-wavelength convexo-concave structures are set so that refractive indexes of the three or more sub-wavelength convexo-concave structures with respect to a polarization direction different from the predetermined polarization direction are the same as each other.

2. The optical element according to claim 1, wherein the groove depths are set so that the predetermined polarization direction of the incident light is diffracted mainly into the specific order.

3. The optical element according to claim 1, wherein the optical element includes two or more of the periodic structures and the pitches of the two or more periodic structures are different from each other so that the predetermined polarization direction of the incident light is diffracted mainly into the specific order.

4. The optical element according to claim 1, wherein the optical element is either a transmissive element or a reflective element.

5. An optical apparatus comprising: two or more optical elements each according to claim 1, wherein a light having been transmitted through one of the optical elements is incident to another optical element.

6. An optical pickup comprising: the optical element according to claim 1, wherein information is recorded in and/or read from a recording medium via the optical pickup.

7. An optical information processing apparatus comprising: the optical pickup according to claim 6, wherein by using the optical pickup, the information of the recording medium is processed.

8. An optical attenuator comprising: the optical element according to claim 1; and attenuation means capable of attenuating a light transmitted through the optical element.

9. A polarization conversion element comprising: the optical element according to claim 1; and a conversion element capable of converting a polarization direction of a light transmitted through the optical element.

10. A projector optical system comprising: the optical element according to claim 1, wherein a light transmitted through the optical element is projected.

11. An optical apparatus system comprising: the optical element according to claim 1.

* * * * *